(12) United States Patent
Wilson

(10) Patent No.: US 9,102,010 B2
(45) Date of Patent: Aug. 11, 2015

(54) SUPPRESSORS AND THEIR METHODS OF MANUFACTURE

(71) Applicant: Bert John Wilson, Mount Maunganui (NZ)

(72) Inventor: Bert John Wilson, Mount Maunganui (NZ)

(*) Notice: Subject to any disclaimer, the term of this patent is extended or adjusted under 35 U.S.C. 154(b) by 0 days.

(21) Appl. No.: 14/138,441

(22) Filed: Dec. 23, 2013

(65) Prior Publication Data

US 2015/0001001 A1 Jan. 1, 2015

(30) Foreign Application Priority Data

Dec. 21, 2012 (NZ) .......................................... 605144
Oct. 22, 2013 (NZ) .......................................... 616919

(51) Int. Cl.
| | | |
|---|---|---|
| F41A 21/00 | (2006.01) | |
| B23K 26/34 | (2014.01) | |
| F41A 21/30 | (2006.01) | |
| F41A 21/36 | (2006.01) | |
| B23K 35/32 | (2006.01) | |
| B23K 35/02 | (2006.01) | |

(52) U.S. Cl.
CPC ........... *B23K 26/345* (2013.01); *B23K 35/0244* (2013.01); *B23K 35/0255* (2013.01); *B23K 35/0272* (2013.01); *B23K 35/325* (2013.01); *F41A 21/30* (2013.01); *F41A 21/36* (2013.01)

(58) Field of Classification Search
CPC ....................................................... F41A 21/30
USPC ............................................ 181/223; 89/14.4
See application file for complete search history.

(56) References Cited

U.S. PATENT DOCUMENTS

| | | | | |
|---|---|---|---|---|
| 4,974,489 | A * | 12/1990 | Fishbaugh | 89/14.4 |
| 6,374,718 | B1 * | 4/2002 | Rescigno et al. | 89/14.4 |
| 8,015,908 | B2 * | 9/2011 | Kline et al. | 89/14.4 |
| 8,091,462 | B2 * | 1/2012 | Dueck et al. | 89/14.05 |
| D685,874 | S * | 7/2013 | Andrews et al. | D22/108 |
| 8,511,425 | B2 * | 8/2013 | Larue | 181/223 |
| 8,578,719 | B2 * | 11/2013 | Kirby | 60/785 |
| D712,997 | S * | 9/2014 | Proske | D22/108 |
| 2010/0126334 | A1 * | 5/2010 | Shults et al. | 89/14.4 |

* cited by examiner

Primary Examiner — Forrest M Phillips
(74) Attorney, Agent, or Firm — Kramer Amado, P.C.

(57) ABSTRACT

Methods and systems to manufacture gun suppressors using laser metal melting (LMM) are disclosed, together with gun suppressors manufactured according to the methods and systems. In preferred forms the LMM process involves deposition of a metal powder such as titanium oxide.

26 Claims, 26 Drawing Sheets

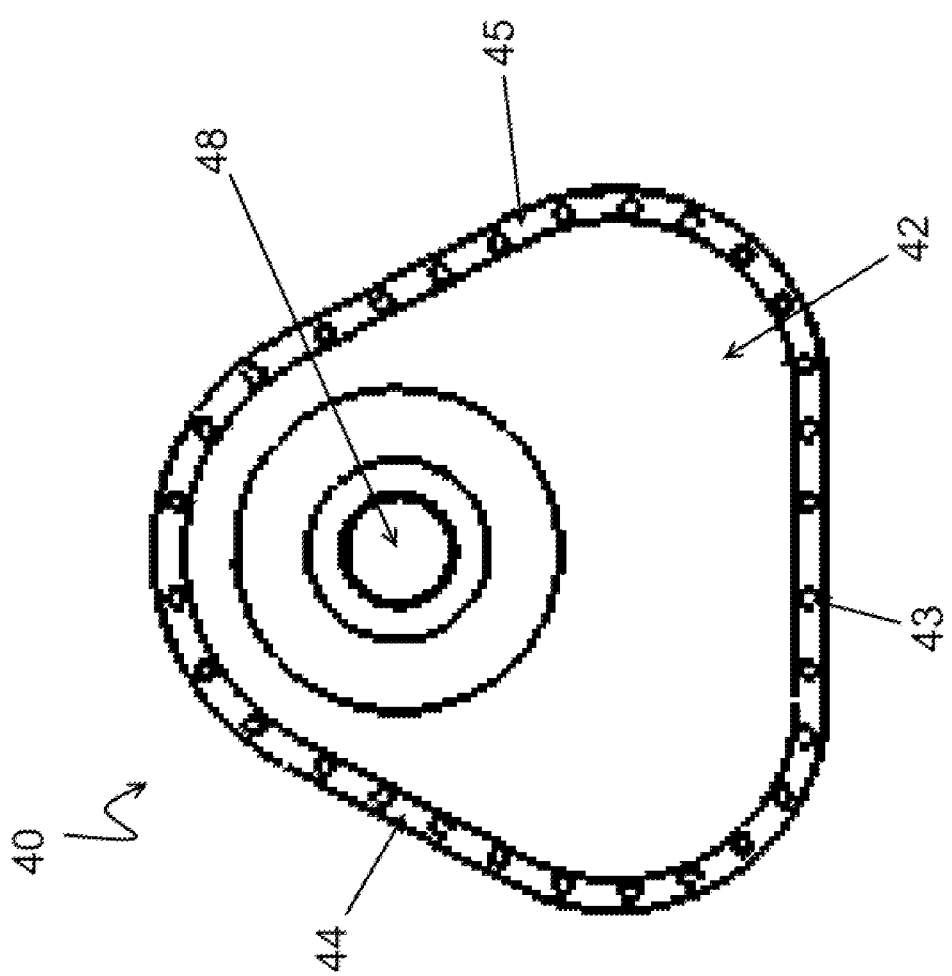

SUPPRESSORS AND THEIR METHODS OF MANUFACTURE

STATEMENT OF CORRESPONDING APPLICATIONS

This application is based on the specifications filed in relation to New Zealand Patent Application Numbers 605144 and 616919, the entire contents of which are incorporated herein by reference.

TECHNICAL FIELD

The present invention relates to improvements to suppressors and their methods of manufacture.

BACKGROUND ART

The weapons called guns use the expansion of a gas to propel a projectile. The gas can take several forms, such as compressed air stored in a canister attached to the gun. Alternatively, fire arms are a sub-type of gun, and use the expansion of a gas created by combustion to propel a projectile.

A combustible material such as gun powder is stored within the projectile cartridge. A firing mechanism in the gun is used to ignite the combustible material. The combustion process creates the gas.

The heat of combustion increases the temperature of the gas, which causes it to expand to an area of lower pressure. The primary exit from the gun is through the open end of the gun barrel. As a result, the gas expands towards the open end of the gun barrel. That expansion is transferred to the projectile, propelling it out from the gun barrel.

The creation and expansion of the gas is a fast process. Accordingly, the projectile exits the gun barrel at high speed.

The generation and expansion of the gas also creates significant noise in the form of a blast wave.

That blast wave is undesirable for a number of reasons. Firstly, the blast wave creates a loud noise, which can damage a person's ears. Repeated exposure to blast waves will result in hearing loss. Secondly, the noise of the blast wave makes the use of guns unpleasant. That may be relevant where people use guns for recreational purposes such as target shooting. Thirdly, the blast wave can create a safety hazard. For instance, police may use guns around volatile gases such as those present in meth labs, or the flash and noise may attract enemy fire.

Devices called suppressors or silencers are used to control the gas expansion and thereby minimise the adverse effects it creates.

One common type of suppressor is a device which is configured to be attached to the end of a gun barrel. These devices include an inlet and an outlet, and a connecting passageway. In-use a projectile fired by the gun passes through the inlet, along the passageway, exiting the suppressor via the outlet.

These suppressors include a series of internal baffles which define chambers within the suppressor. The gas generated during firing of the projectile is able to expand into the chambers. The chambers are arranged such that a first chamber is comparatively larger than the volume of the gun barrel. Accordingly, the first chamber provides a large volume into which the gas may expand. The gas can subsequently expand into adjacent chambers in the suppressor. Together, the chambers facilitate a gradual expansion of the gas. As a result, the expansion of the gas is slower than were the suppressor not used, which minimises the noise created by the blast wave.

Another type of suppressor is provided by drilling holes in the gun barrel, and positioning a "can" or suppressor body about the gun barrel. The barrel and suppressor are therefore configured so that the expanding gasses are released sequentially into the suppressor body along a portion of the gun barrel's length. Obviously the bullet only comes out the end of the barrel, but gasses have the option of expanding into the suppressor body rather than exiting the end of the gun barrel.

All suppressors are designed to minimise any adverse affects on the passage of a bullet e.g. the suppressor does not alter the bullet's trajectory or reduce its velocity.

There are a number of different techniques known to construct suppressors. The most common technique is deforming sections of a rigid sheet material, and securing these together via welding. Alternatively components can be formed by machining of materials to form components that are then connected together by welding or fastening with threaded connectors. These techniques are often used to form the main (outer body) of the suppressor.

In yet another common manufacturing method a main, hollow body is first formed. Baffles are subsequently secured to the body using techniques such as welding, or using spacers and threaded retainers.

Another technique involves forming, casting or machining a mono-core baffle structure. This is subsequently secured within a hollow outer body.

However, all of the known techniques for manufacturing suppressors have disadvantages.

For instance, it is difficult to accurately position and weld baffles inside the main body of the suppressor. Even if a person has sufficient skill to secure the baffles in position then it is a time consuming and costly process.

Often, baffles are incorrectly positioned when assembled. This can lead to problems such as ineffective suppression of noise generated by the blast wave. Even worse, incorrect positioning of baffles can lead to baffle strike, where a projectile contacts the baffle. This is a health and safety issue and can injure the person using the gun as it would cause the projectile to travel in an unintended direction. It will also damage the suppressor and make it unusable.

In addition suppressors made as described above may not be sufficiently durable to withstand the common forces experienced in use. The weight of the various components may also increase the weight of the suppressor, hindering its ease of use.

Newly developed manufacturing techniques provide opportunities for manufacturing of suppressors. For instance, selective metal melting ("SMM"), and laser metal sintering ("LMS") which is a sub-type of SMM, are three dimensional printing technique that can be used to manufacture different types of products, from a metal powder feed material Both of SMM and LMS are additive layer manufacturing processes, that utilise a manufacturing apparatus to convert computer generated (CAD) models into three dimensional products. A metal powder is distributed onto a substrate/support, and a laser is directed onto at least a portion of the layer of powder. The laser heats the powder so as to fuse selected individual particles together to form a portion of the product.

The laser is then disengaged and a wiper is used to deposit another layer of metal powder. The laser is then again used to heat selected powder particles and fuse those together. The process is repeated to substantially create the required product.

LMS techniques have been used to manufacture components of suppressors. For instance, LMS has been used to construct baffles for a suppressor. In that situation, the baffles were secured to a spine. The spine and baffles were subsequently secured within a housing, and the housing was closed by attachment of end walls using techniques like welding. However, those products are limited because the individual components must subsequently be assembled. Therefore, the prior art has not maximised the efficiency of the manufacturing process.

In addition, the outer housing in which the spine/baffle structure was secured was not manufactured using LMS techniques. This indicates that manufacturing both the housing and internal baffles using LMS techniques was a difficult process, and not one which was easily achieved.

It is also possible that the baffles will not provide a complete seal to create appropriate cavities within the housing. As a result, the suppressors manufactured using these methods may not adequately control expansion of gases within the suppressor. As a result, those products are unlikely to function as an effective suppressor.

Furthermore, the creation of a spine involves redundant material. Therefore, the suppressors manufactured using LMS to produce separate components are unduly heavy. As a result they do not provide a completely satisfactory solution to the needs for manufacturing suppressors. Additive layer manufacturing processes, and particularly LMS, have a number of inherent issues which have inhibited their successful use in manufacturing of products such as suppressors.

In developing a method of manufacturing a suppressor, the inventor encountered several problems. For instance, the powdered material deposited must be supported before it is fused. The necessary supporting must be provided by the layer of material which has previously been fused. Insufficient support will likely result in the build failing. These problems are most relevant where a structure is being created that is not parallel to the build direction. This is a significant limitation on the design of products which can be manufactured using LMS technology.

Other problems include the creation of heat stress in the suppressor during melting of the deposited layers. These stresses create problems such as warping of the components of the suppressors, which meant hindered successful creation of a suppressor using LMS technology. This may be due to different components of the suppressor having different thicknesses, which means that the components react differently to the heat applied to fuse the deposited powdered material. This is a particular relevant in manufacturing suppressors, which are looking to maximise cavity volume, have sufficient strength to withstand the force of expanding gases, and minimise the suppressors total volume.

The inventor investigated existing applications in which LMS techniques have been utilised to produce complex products having a substantially closed internal cavity, and internal structures within the cavity, so as to assist in developing a suppressor design using LMS techniques. However, the issues of providing sufficient support for a layer of deposited material prior to fusing still required significant effort and inventive contribution to solve in the particular application of suppressors.

For instance, PCT Publication No. WO 2008/118973 describes how to manufacture a product having an internal baffle or structure. That product must be built from one of the four corners of the housing and having the housing at a 45° angle to the horizontal. That limits the orientation of the components that can be constructed inside the housing. In fact, the manufacturing techniques described in PCT Publication No. WO 2008/118973 would not enable construction of a suppressor having function baffles therein.

Accordingly, it would be advantageous to have an improved suppressor, and method of manufacture, which addresses any or all of the foregoing problems.

Alternatively, it is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention, there is provided a method of manufacturing a suppressor having a housing with a cavity, and at least one component within the cavity, wherein the method uses a selective metal melting technique, the method including the steps of:
  (a) depositing a feed material onto a substrate;
  (b) melting the feed material to form part of the housing;
  (c) melting the feed material to form part of the at least one component so that at least a portion of the component is formed integrally to an inner wall of the housing;
  (d) repeating steps (a)-(c) so as to substantially form the housing and the at least one component;
  (e) determining an angle between an underside of the at least one component and a surface of a wall inside the housing to be at least 10°, and more preferably in the range of 15° to 85°.

According to another aspect of the present invention, there is provided a suppressor manufactured according to the method as substantially described above.

According to another aspect of the present invention, there is provided a suppressor manufactured using a selective metal melting technique, the suppressor including
a housing with a cavity,
at least one component within the cavity, wherein at least a portion of the component is formed integrally to an inner surface of the housing,
and wherein an angle between an underside of the component and a wall inside the housing is at least 10°, and more preferably in the range of 15° to 85°.

The present specification describes a number of inventions relating to the use of additive layer manufacturing techniques such as selective metal melting ("SMM").

In preferred embodiments, the method according to the present invention uses a SMM technique such as laser metal sintering (LMS).

Throughout the present specification references to the term "laser metal sintering" should be understood as meaning a deposition manufacturing technique in which layers of feed material are heated to cause selective fusing between sections of the layers. In LMS the heat necessary to melt the feed material is applied using a laser.

Reference will be made herein to the present inventions with LMS techniques. However, this should not be seen as limiting on the scope of the present invention. Other variants of SMM manufacturing techniques are envisaged as being within the scope of the present invention.

It is also envisaged that the method can use deposition manufacturing techniques other than LMS. For instance, the forming technique may use ion beam melting techniques, or non-metal compounds such as plastics or resin materials.

As SMM and LMS techniques are known to those skilled in the art they will not be described in full herein. Rather, the present invention(s) will now be described with sufficient information for one skilled in the art to comprehend and implement the invention(s) without any inventive contribution and using known wisdom.

In particularly preferred embodiments, the present inventions find application in manufacturing suppressors, and therefore reference will be made herein as such.

In preferred embodiments the suppressor is a device that in-use reduces the noise and/or flash created by operation of a gun. This is as should be known to one skilled in the art.

However, the suppressor could also be used with other devices in which noise created by gas expansion is problematic.

Throughout the present specification reference to the term "angle between a surface inside the housing and the at least component" should be understood as referring to the angle between an imaginary plane and the lowest point of the component. The imaginary plane and the lowest point on the component are both determined with reference to the build direction for the product e.g. from the substrate used in the LMS technique.

In a preferred embodiment, the angle is selected according to the orientation of the baffle.

In a particularly preferred embodiment, the angle is selected from the following relationships:

The applicant has identified that selection of the correct angle is particularly advantageous to manufacturing components in a cavity, particularly where temporary support structures cannot be subsequently removed from the cavity after manufacture.

The angles are dependent on a number of factors such as the shape of the component to be manufactured, the direction in which the component is being manufactured with respect to the build direction, and/or the length and width (diameter) of the component. In addition, the thickness of the component being manufactured, and the thickness of components on which the layers of material are being deposited (e.g. a relative thickness of two components) may affect angle selection.

However, one skilled in the art would be able to select the necessary angles from those described herein without any inventive contribution or undue experimentation.

The range of angles identified herein enables successful and efficient manufacturing of products which have internal components the shape and configuration of which hinder manufacturing by LMS.

In the particularly preferred embodiment, the feed material may be selected from the list of: titanium or a titanium alloys, pure titanium (TI), TI6A14V, NITI(45-55NI), TI6A17MB, TI5A12.5FE, TI3NB13ZR, TI12MO6ZR2FE, NITICU alloys, TI15MO, TI35NB7ZR, 5TA, TI3A1 2.5V, or Inconel 718.

However, the foregoing should not be seen as limiting on the scope of the present invention and alternatives for the feed material are envisaged as being within the scope of the present invention. For instance, the starter material may be any fine metal powder such as cobalt and/or chrome alloy powders, or nickel-based alloy powders.

In the preferred embodiments the housing is formed by a first end wall, a second end wall and at least one side wall and the at least one component within a cavity in the housing is a baffle.

However, the foregoing should not be seen as limiting on the scope of the present invention. For instance the present

| Structure | Direction of structure | Example of use | Angle or Radius Size |
|---|---|---|---|
| Cone | Towards the centerline of the product | Baffle in a suppressor | 15° to 85° |
| Cone | Away from the centerline of the product | Baffle in a suppressor | 45° to 85° for a component having a length of greater than 2 mm; or under 15° for a component having a length less than 2 mm |
| Lead in angle on linear support structure | Not Applicable | Support structures from which a flat surface can be created e.g. for internal compartmentalisation without a lower contiguous start plane | 40° or more |
| Overhead flat shelves | | Beginning of attachment to barrel or any structure parallel to build surface | Must not be larger than 2 mm in area from support |
| Top wall - bulk radius (closes structure) | Toward and away from centerline of product | To create a roof for the suppressor and seal the cavity while reducing use of cavity volume by structure. | 4 mm radius |

Reference through the present specification may be made to different types of components such as a radius, a cone, and a column. These terms describe the shape of the component.

inventions may also be useful where it is desirable to manufacture using SMM techniques any product which has a component in a cavity, and examples of such components are discussed below. This may be particularly beneficial where the housing is shaped so that the component cannot be removed from the cavity.

According to another aspect of the present invention there is provided the use in the manufacture of a suppressor, of selective metal melting, the suppressor including
a first end wall,
a second end wall,
at least one side wall between the first and second end walls, wherein the first and at least one side wall collectively define a cavity,
at least one baffle within the cavity.

According to another aspect of the present invention there is provided a suppressor, including
a first end wall,
a second end wall,
at least one side wall connecting the first and second end walls,
wherein the end walls and side wall(s) collectively define a cavity,
at least one baffle inside the cavity,
characterised in that
at least one of the baffles inside the cavity is formed integrally to an inner surface of the side wall(s).

According to another aspect of the present invention there is provided a method of manufacturing a suppressor, wherein the suppressor includes a first end wall, a second end wall, and at least one side wall connecting the first and second end walls, and at least one baffle that is formed integrally to an inner surface of the at least one side wall,
wherein the method includes the steps of:
  (a) depositing a starter material onto a substrate;
  (b) melting the starter material to form part of the suppressor;
  (c) repeating steps (a) and (b) so as to substantially form the suppressor.

Throughout the present specification reference to the term "formed integrally" should be understood as meaning that there is no join between any two parts of a suppressor manufactured using the method described herein.

Having two or more components formed integrally to each other may improve the strength and durability of the suppressor.

In addition, having the components formed integrally to each other during manufacture may reduce the need to accurately align numerous components and secure these together using welding or other techniques.

It should be understood that the term "formed integrally" excludes suppressors where components are first shaped or formed, and then subsequently secured to each other by techniques such as welding. In such suppressors there is a mechanical join where the two formerly separate components are attached together. In contrast, the present invention has no such join(s).

This also excludes the prior art attempts to use SMM to manufacture suppressors. In those, components such as baffles were first formed integrally to a separate spine, and then secured in a tube to form the suppressors. They do not have the baffles formed integrally to an inner wall of the housing.

In particularly preferred embodiments, all components of the suppressor are formed integrally to each other. This enables the suppressors to be substantially manufactured without any subsequent assembly, or additional finishing.

However, the foregoing should not be seen as limiting on the scope of the present invention and it is also envisaged that the suppressors may be manufactured in separate components and subsequently secured together.

Throughout the present specification reference to the term "side wall" should be understood as meaning at least one wall of the suppressor which connects the end walls.

In a particularly preferred embodiment, the side wall may be substantially continuous.

Throughout the present specification reference to the term "substantially continuous" refers to the fact that the side wall does not include any apertures therein.

In these embodiments, the side wall is continuous between the first and second end walls.

However, the foregoing should not be seen as limiting on the scope of the present invention. It is also envisaged that the side wall may include vents. These vents are shaped and configured so as to vent gases expanding within the suppressor. In these embodiments, the vents are shaped and configured so as to ensure that the sound of gases being vented from the suppressor is reduced from that emitted without use of the suppressor, and preferably non-audible to humans.

In a preferred embodiment, suppressors according to the present invention include a fastener.

Throughout the present specification reference to the term "fastener" should be understood as meaning a component configured to secure the suppressor to a gun.

Throughout the present specification reference to the term "baffle" should be understood as meaning a wall inside the cavity.

In preferred embodiments, the baffle is substantially cone shaped. Accordingly, the angle at which the baffle is constructed is selected according to the orientation of the baffle, whether being built from inside to outside, and the angles discussed herein.

However, the baffle may also be a flat wall or structure. Therefore the foregoing should not be seen as limiting on the scope of the present invention.

In a preferred embodiment, the present inventions include two or more baffles inside the cavity.

In particularly preferred embodiments, each of the baffles are formed integrally to an inner surface of the side wall.

Each baffle, in combination with the side wall, end wall(s), and/or another baffle define chambers within the cavity.

In preferred embodiments the suppressors according to the present invention include an inlet and an outlet.

Throughout the present specification reference to the term "inlet" should be understood as meaning an opening in the suppressor through which a bullet may enter the suppressor.

Throughout the present specification reference to the term "outlet" should be understood as meaning an opening in the second end wall through which a bullet may exit the chamber.

In preferred embodiments the inlet and outlet are aligned with each other such that a bullet can pass through the inlet, travel through the pathway, and exit from the cavity via the outlet.

Throughout the present specification reference to the term "pathway" should be understood as meaning a path through which a bullet may travel between the inlet and the outlet.

Therefore, in embodiments where the suppressor includes two or more baffles then each of the baffles includes an aperture. The apertures are each aligned with each other, the inlet and the outlet.

In a particularly preferred embodiment the pathway lies substantially along a longitudinal axis of the suppressor that is on the centre line of the suppressor.

However, the foregoing should not be seen as limiting on the scope of the present invention. It is also envisaged that the pathway may be off-centre from the central longitudinal axis of the body in order to allow a lower profile for the gun and suppressor in use. Furthermore, this may minimize the suppressor hindering a user's line of sight.

In an alternate embodiment the suppressors according to the present invention are asymmetrical.

Throughout the present specification reference to the term "asymmetrical" should be understood as meaning that the suppressor is not symmetrical about an imaginary plane extending along its longitudinal axis and that is substantially horizontal in the suppressor's normal in use orientation.

Having an asymmetrical suppressor enables the components of the suppressor to be provided substantially in line with or below the gun barrel when the suppressor is in use. As a result, this may minimise the amount of the suppressor which is in a user's line of sight. However, the suppressor still has sufficient baffles and chamber volume to suppress noise produced by the gun to a desired level.

In a preferred embodiment, suppressors according to the present invention include a grip. Throughout the present specification reference to the term "grip" should be understood as meaning a component configured to facilitate attaching the suppressor to a gun.

In a particularly preferred embodiment the grip is at least one or more ridges on an outer surface of the body of the suppressor. In-use the ridges facilitate a person gripping the body so as to rotate the suppressor to thereby connect or release the suppressor from the gun.

The ridges facilitate a person rotating the suppressor sufficiently that it is tightly secured to the gun. In addition, the ridges facilitate the person rotating the suppressor so as to disengage the gun. That may be useful where a suppressor has been tightly secured to a gun.

However, it is also envisaged that the grip may take other forms such as a handle extending away from the body of the suppressor. As a result, the foregoing should not be seen as limiting on the scope of the present invention.

In a particularly preferred embodiment, the fastener may be a fastener half forming part of a quick connect. The term "quick connect" is a term of the art, referring to an assembly to attach two objects together that does not require multiple rotations of more than a nominal angle to secure the objects together. In contrast, a standard screw thread fastener for use in a suppressor generally requires about 15-18 full turns (15 to 18×360°) to achieve a secure attachment.

In these embodiments, a fastener half of the quick connect is located within the overlap channel of the fastener (as is discussed below) e.g. the fastener half is within the length of the suppressor. However, the fastener half could also protrude beyond the end of the suppressor.

Other embodiments for the fastener are also envisaged. For instance, the fastener may be a screw thread complementary to a corresponding screw thread on a gun barrel or a fitting secured on a gun barrel.

In these embodiments, the screw thread has a pitch and length corresponding to a screw thread on the barrel of a gun with which the suppressor is used. The aspects of the screw thread are as should be understood by one skilled in the art.

The foregoing should not be seen as limiting on the scope of the present invention. It is also envisaged that the fastener can take other forms including twist lock type connectors, spring biased detents, or fastening assemblies having fittings configured to be secured over the end of a gun barrel.

In a preferred embodiment, the present invention includes a muzzle brake.

Throughout the present specification reference to the term "muzzle brake" should be understood as meaning a component attached or formed integrally to a gun barrel and which assists in controlling expansion of gases generated during firing of the gun to thereby reduce recoil. The term "muzzle brake" is as understood by one skilled in the art.

In a particularly preferred embodiment, the muzzle brake is a separate component configured to be secured to an end of a gun with which the present invention is utilised.

In a particularly preferred embodiment, the muzzle brake includes a fastener half that is configured to engage with a complementary fastener half on the suppressor. The fasteners halves together form a quick connect as discussed herein.

The inventor has identified that use of a muzzle brake is particularly advantageous in providing further control of gas expansion within the suppressors according to the present invention. The present inventions facilitate provision of a muzzle brake using LMS techniques.

However, the foregoing should not be seen as limiting on the scope of the present invention. It is also envisaged that the suppressor may not include a muzzle brake, or that the muzzle brake may be formed integrally into the barrel of a gun.

Furthermore, utilising LMS manufacturing techniques it is possible to provide a muzzle brake in combination with a fastener half of a quick connect. Previously, it has not been possible to utilise the combination of a muzzle brake and quick connect in combination for reflex style suppressors. Using prior art techniques, it was impossible to provide the muzzle break within reflex type suppressors. Therefore the muzzle brake would extend from the end of the suppressor and would lengthen the suppressor which creates different problems.

In preferred embodiments, the present invention may include an overlap channel.

Throughout the present specification reference to the term "overlap channel" should be understood as meaning a channel configured to receive and overlap part of a gun barrel.

Use of an overlap channel enables provision of chambers within the suppressor which, when the suppressors are secured to a gun, are positioned so as to overlap a portion of the length of the gun barrel. Suppressors having these channels are often called "reflex-style" suppressors. The overlap channel is useful to reduce the overall length of a gun and suppressor secured together. That in turn is useful to reduce the instances of baffle strike by providing a longer concentric mating surface to reduce potential misalignment of the gun and suppressor.

Preventing misalignment of the gun barrel and suppressor also helps to reduce the force which the suppressor experiences in use, thereby reducing wear and tear or damage to the suppressor.

Furthermore, the use of an overlap channel ensures that the centre of gravity of a gun with a suppressor secured thereto is closer to the gun handle. As a result, the turning moment of the weight is reduced, making the gun and suppressor combination easier to use.

In a preferred embodiment, the suppressor includes a double wall structure.

Throughout the present specification reference to the term "double wall structure" should be understood as referring to at least an inner and an outer wall.

The outer wall provides the aesthetic appearance and structural support for the suppressor. The inner wall is a pressure vessel which defines chambers within which a gas can expand the outer wall defines at least one cavity (gap) between itself and the inner wall.

The double layer wall arrangement provides insulation to prevent heat transfer from the chambers in which a gas expands to the outer surface of the suppressor. Therefore, a user is less likely to burn their hand on touching the suppressor after use. In addition, the double layer wall helps to eliminate mirage in optics from heat generated by use of the suppressor. Accordingly, the utilisation of a double layer wall assists in providing a suppressor having improved safety characteristics.

BRIEF DESCRIPTION OF THE DRAWINGS

Further aspects of the present invention will become apparent from the ensuing description which is given by way of example only and with reference to the accompanying drawings in which:

FIG. 9B is an end on view of the suppressor of FIG. 9A;

BEST MODES FOR CARRYING OUT THE INVENTION

Throughout the Figures like numerals refer to like components.

Figure 1:
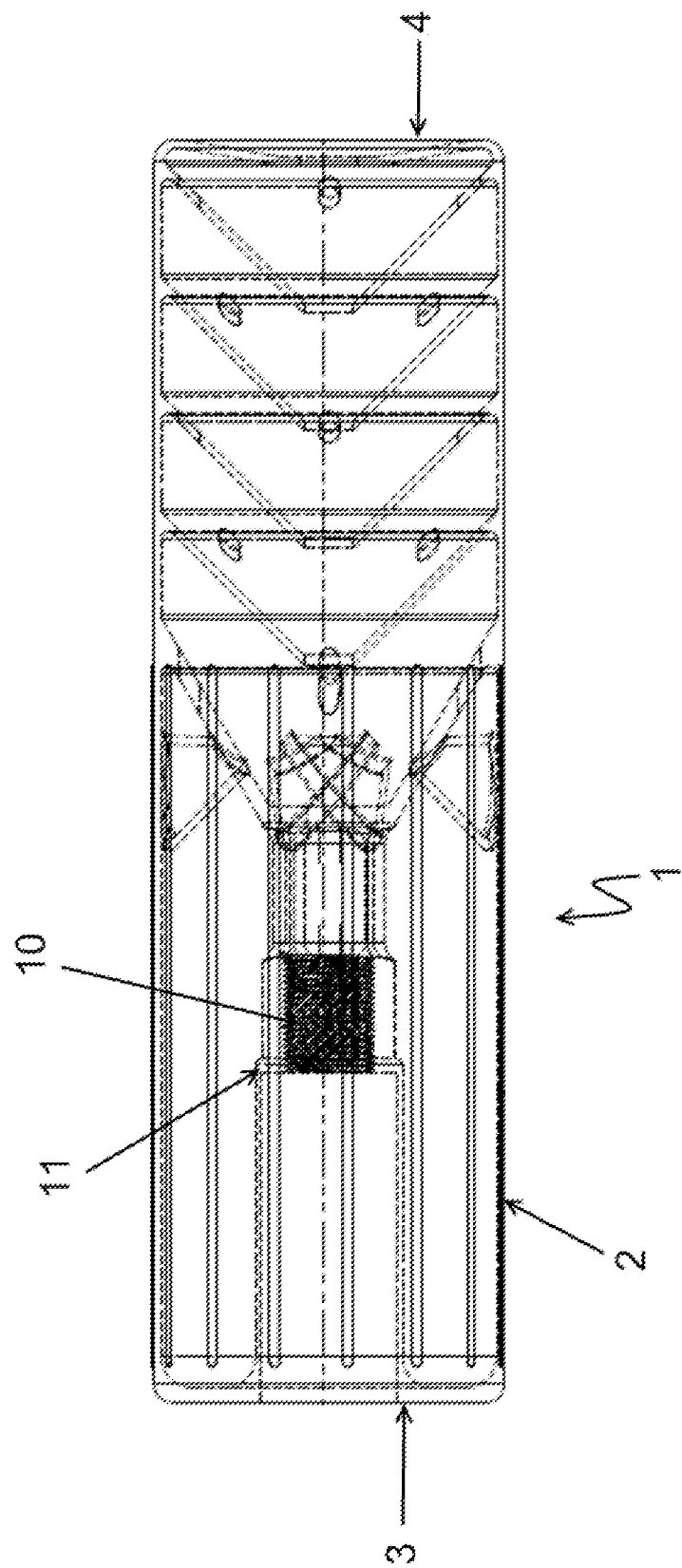
FIG. 1 is a side "look through" view of a first embodiment of a suppressor according to one aspect of the present invention.
Figure 2:
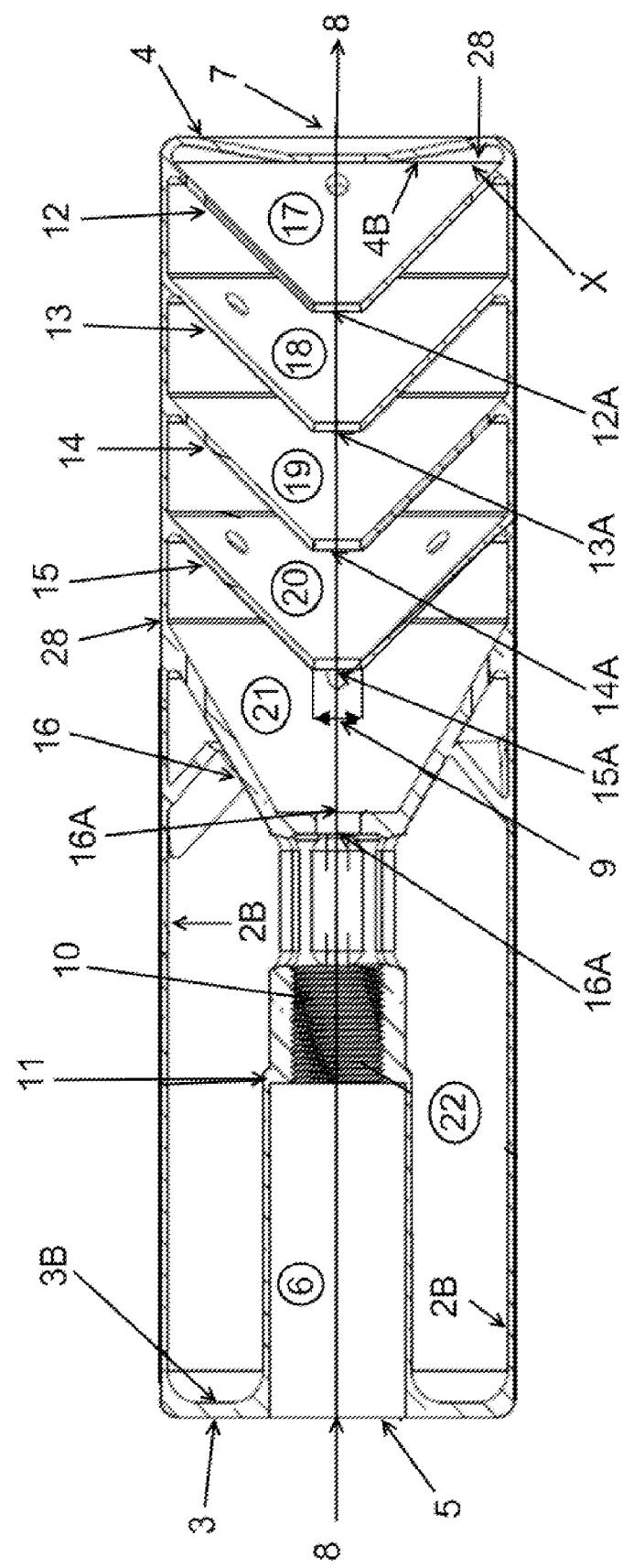
FIG. 2 is a cross sectional view through line C-C in FIG. 1.

Referring first to FIGS. 1 and 2, there is provided a suppressor (1).

The suppressor (1) is manufactured using a selective metal melting technique such as laser metal sintering ("LMS") techniques as are discussed below.

The suppressor (1) is a monocoque structure with all components formed integrally to at least one other component, therefore together.

The suppressor (1) is a substantially hollow cylinder defined by a continuous side wall (2), a first end wall (3) and a second end wall (4) that define a cavity.

First end wall (3) has an aperture (5) into an overlap channel (6). The overlap channel (6) is configured to receive an end of a gun barrel (not shown).

Second end wall (4) includes an aperture (7).

A pathway, indicted by line (8) extends from aperture (5) through to aperture (7). The diameter of pathway (8) is shown by line (9) in FIG. 2.

A screw thread (10) is provided at end (11) of overlap channel (6). The screw thread (10) is configured to engage with a corresponding screw thread on an end of a gun barrel (not shown in the Figures).

The suppressor (1) has a plurality of internal baffles (12, 13,14,15,16).

The baffles (12-16) separate the cavity in the suppressor into a series of chambers (17,18,19,20,21,22). Each of the chambers (17-22) is defined by a baffle (12-16), inner surface (2b) of continuous side wall (2), inner surface (3a) of first end wall (3), and/or inner surface (4a) of second end wall (4).

Chamber (22) acts as a primary blast chamber of the suppressor (1). The primary blast chamber (22) has a larger volume than chambers (17-21).

Each baffle (17-22) includes an aperture (12a-16a) respectively. The apertures (12a-16a) are aligned with each other, and apertures (5,7). Accordingly, the apertures (12a-16a) are positioned on pathway (8). It is therefore possible for a bullet fired by gun (neither shown) to travel along pathway (8) so as to exit suppressor via aperture.

Figure 5A:
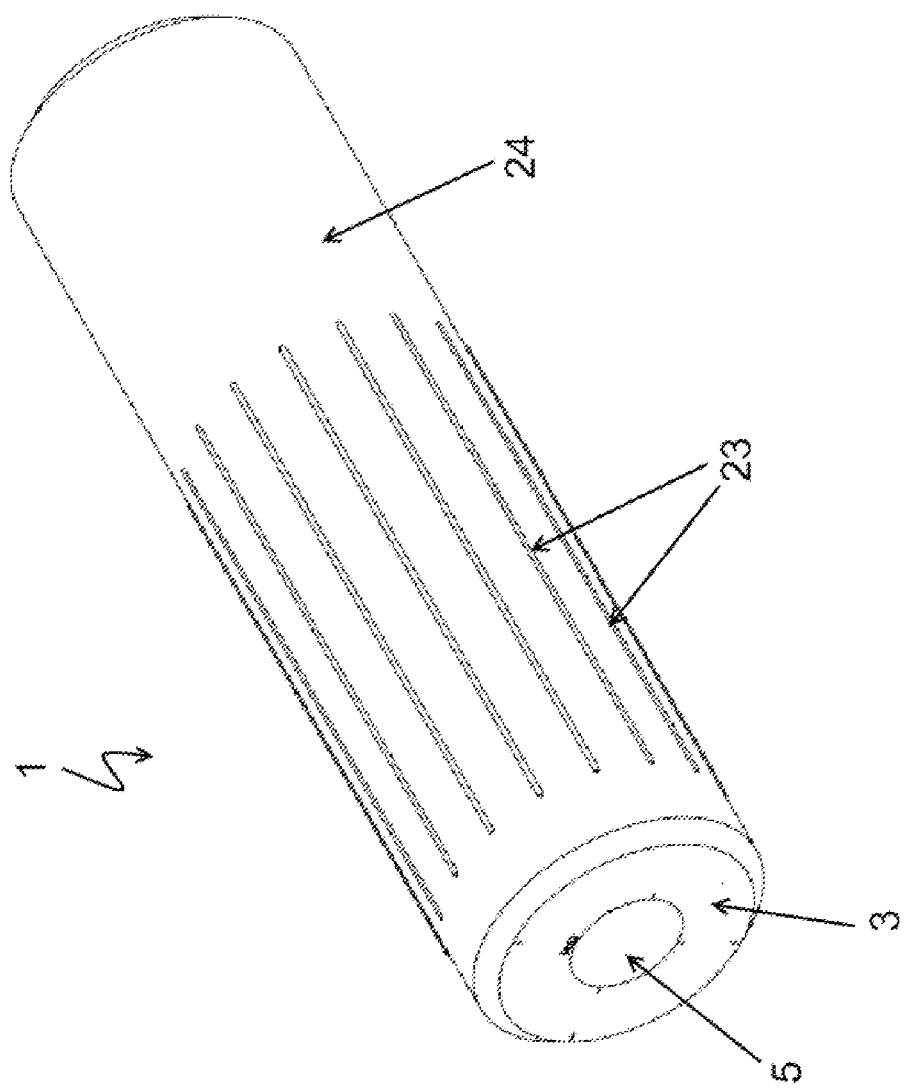
FIG. 5A is a first end on perspective view of another embodiment of a suppressor according to one embodiment of the present invention.
Figure 5B:
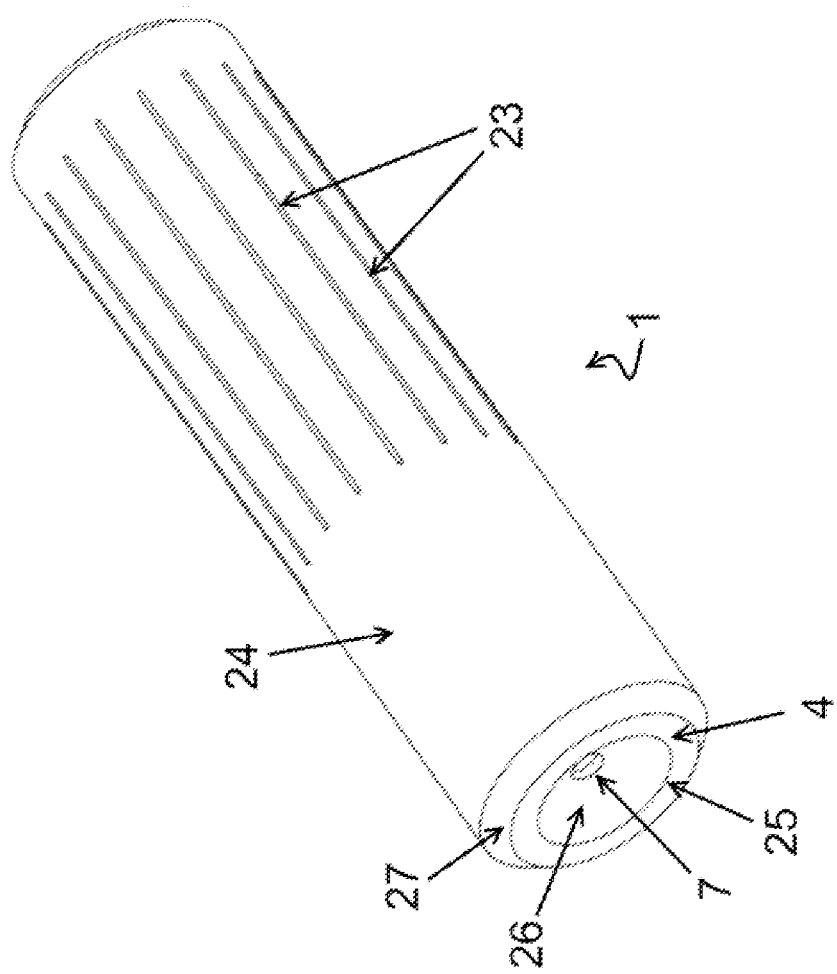
FIG. 5B is a second end on perspective view of the suppressor shown in FIG. 5A.

Referring now to FIGS. 5A and 5B, the suppressor (1) includes a grip in the form of ridges (23) on an outer surface (24) of continuous side wall (2).

The ridges (23) facilitate a person rotating suppressor (1) so as to cause screw thread (10) to engage with a corresponding screw thread on gun barrel (not shown).

Second end wall (4) includes a forming surface indicated as (25). The forming surface (25) is a ring. Inner side (26) and outer side (27) are at an angle to forming surface (25).

An internal angle between an underside of the baffles (17-22) and an imaginary plane (28) from the inner surface (2B) of side wall (2) is indicated by (X). The imaginary plane (28) is substantially perpendicular to an inner surface of continuous side wall (2) and substantially parallel to the build direction.

First, Second and Third Alternate Embodiments

Figure 3:
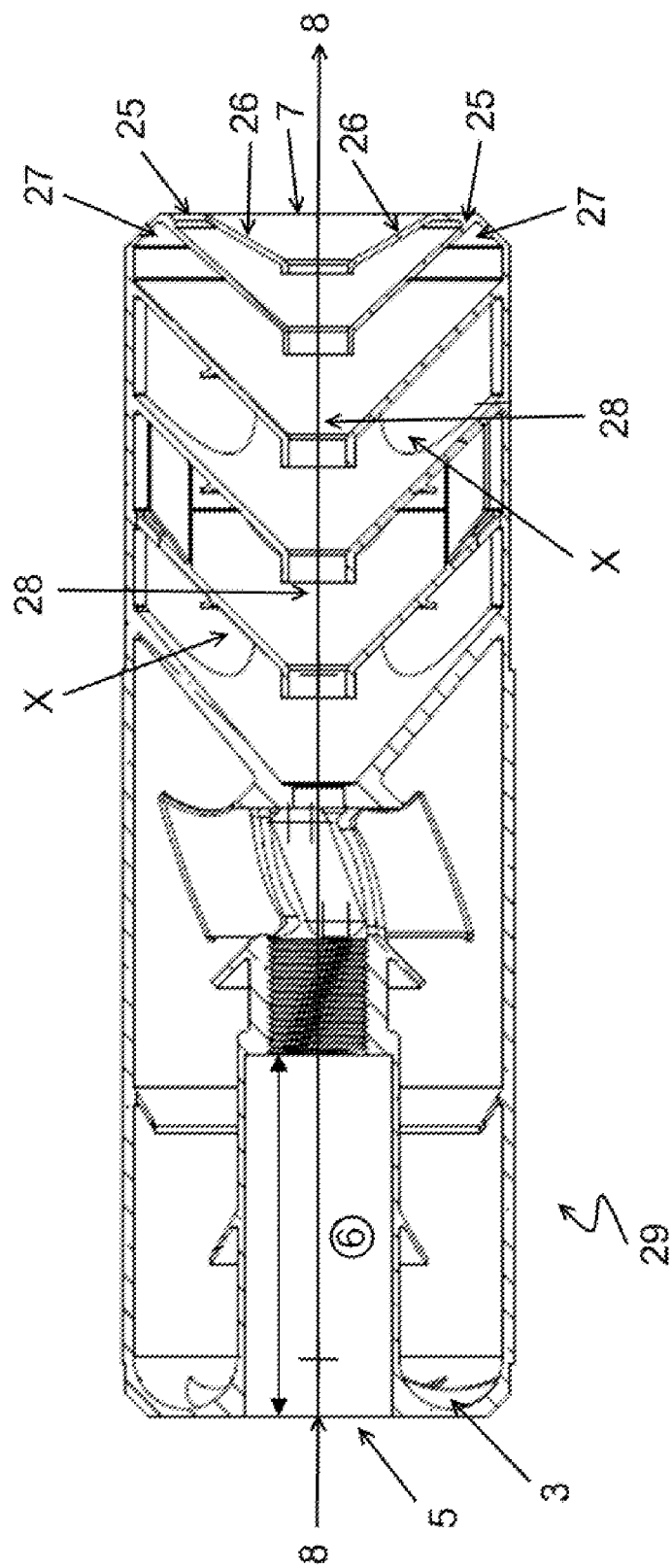
FIG. 3 is a cross sectional view of another embodiment of a suppressor according to the present invention.
Figure 4:
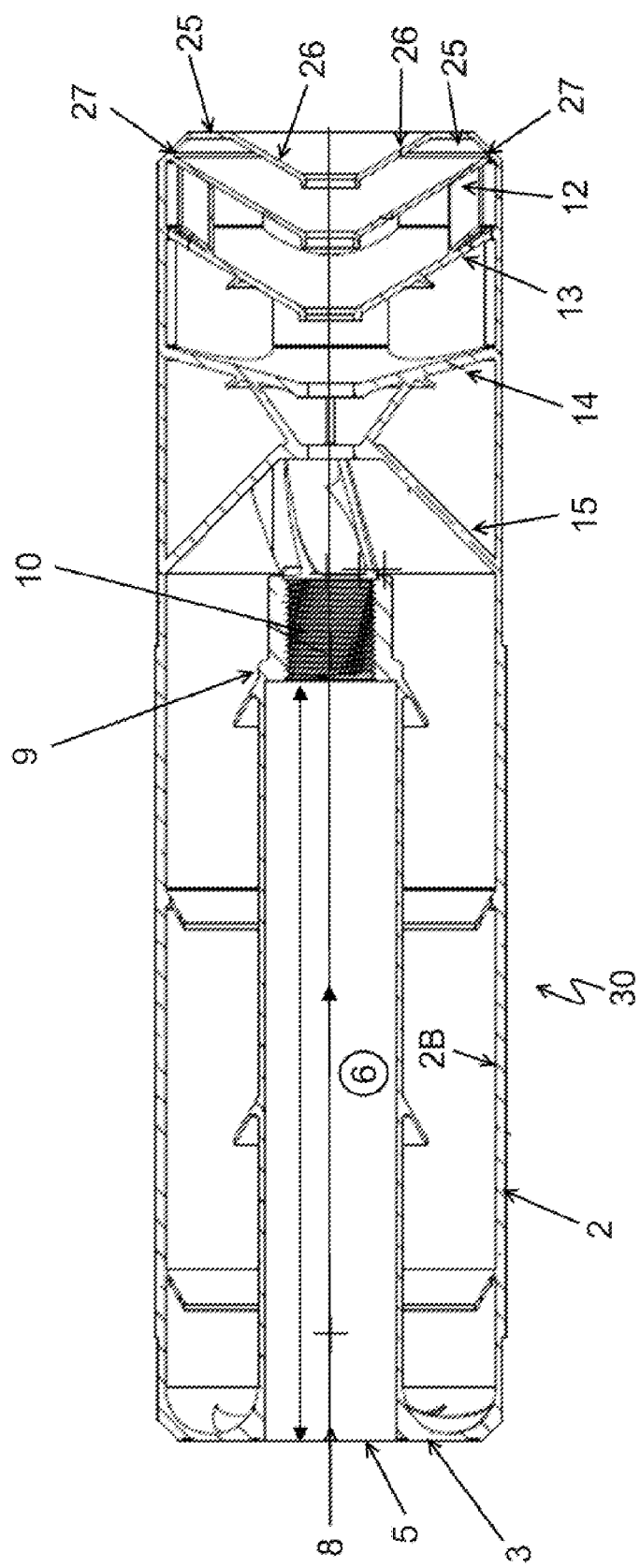
FIG. 4 is a perspective view of an alternative embodiment of a suppressor according to the present invention.
Figure 6:
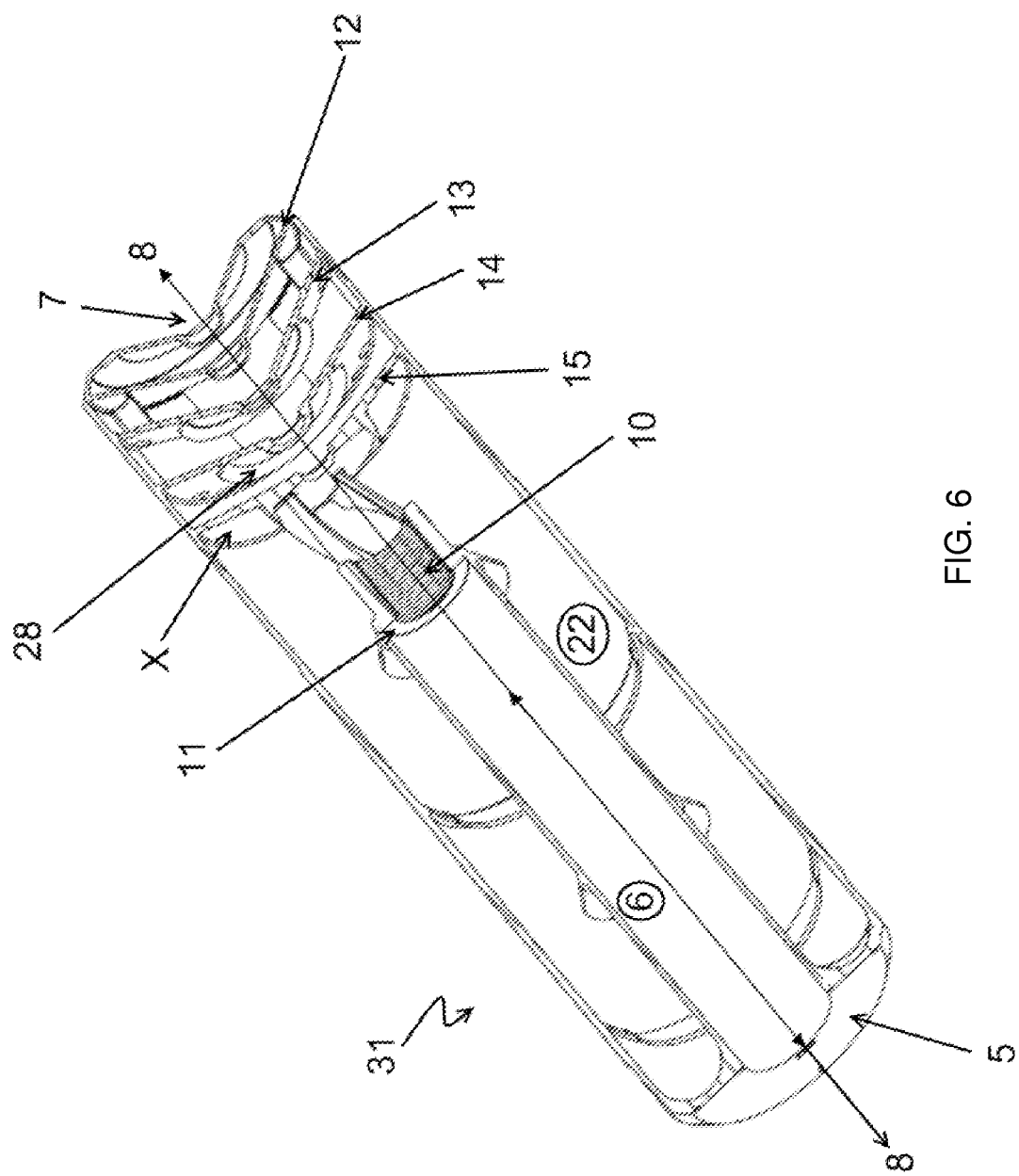
FIG. 6 is a cross-sectional view of FIG. 5A.

FIGS. 3, 4 and 6 show views of alternate embodiments of suppressors (29,30,31) according to the present invention. Identical numbers are used to refer to the components of suppressors (29-31) in FIGS. 3, 4, and 6 that are the same as the components of suppressor described with reference to FIGS. 1 and 2. However the arrangement/orientation of the baffles differ so as to facilitate provision of a suppressor that may be better suited to use with different types of guns.

Fourth Alternate Embodiment

Referring now to FIGS. 9A-9D, showing a further embodiment of a suppressor (40).

The suppressor (40) has a substantially triangular cross section as is best shown in FIG. 9B.

The suppressor (40) has a first end wall (41), a second end wall (42), a first side wall (43), a second side wall (44), and a third side wall (45).

Figure 10A:
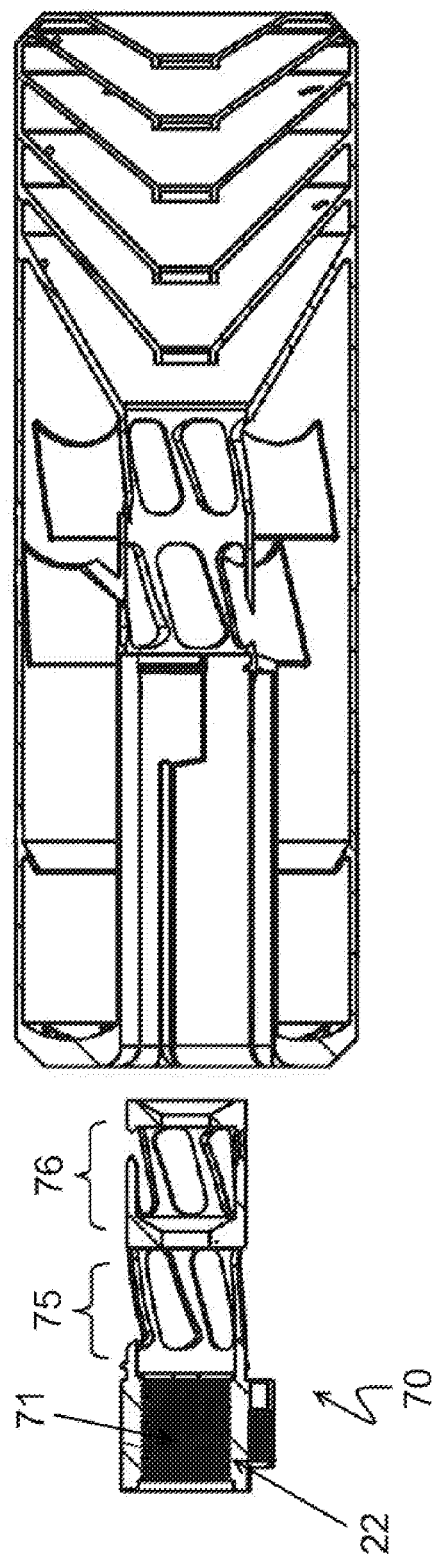
FIG. 10A is a side view showing a muzzle break adjacent to a suppressor with which it is used.
Figure 10B:
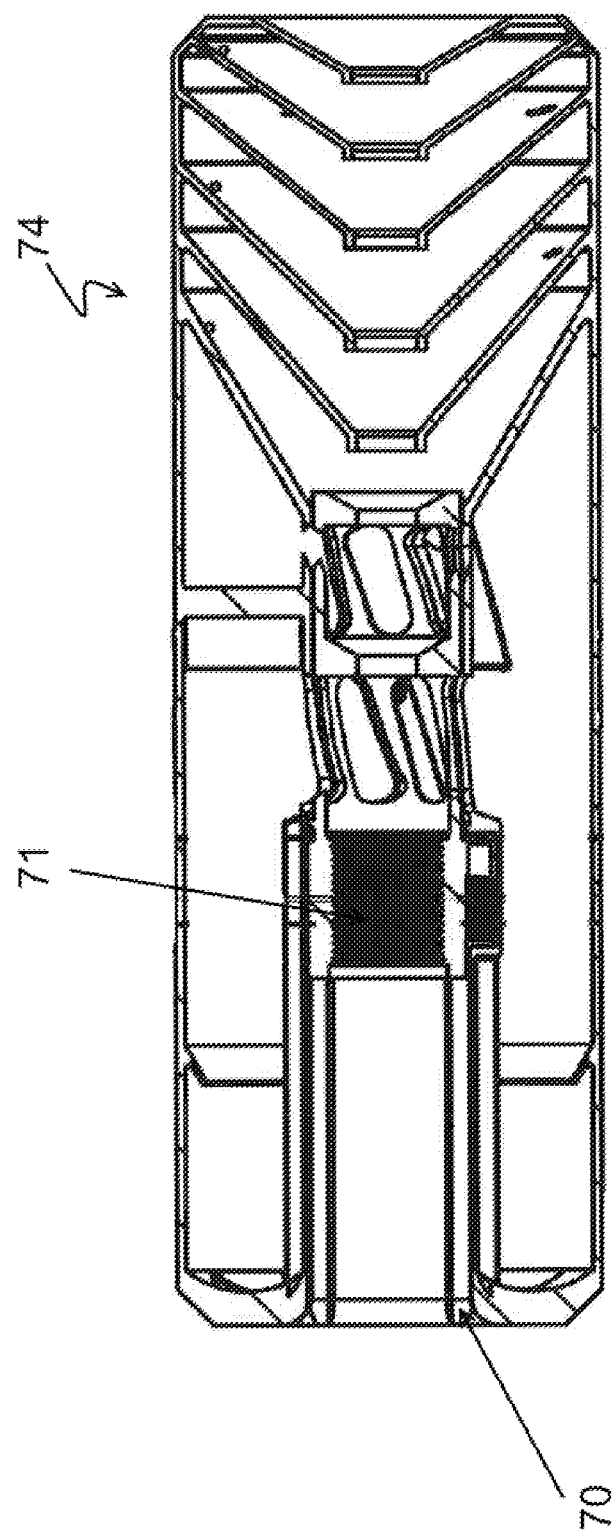
FIG. 10B is a side view showing the muzzle break and suppressor of FIG. 10A engaged together.
Figure 10C:
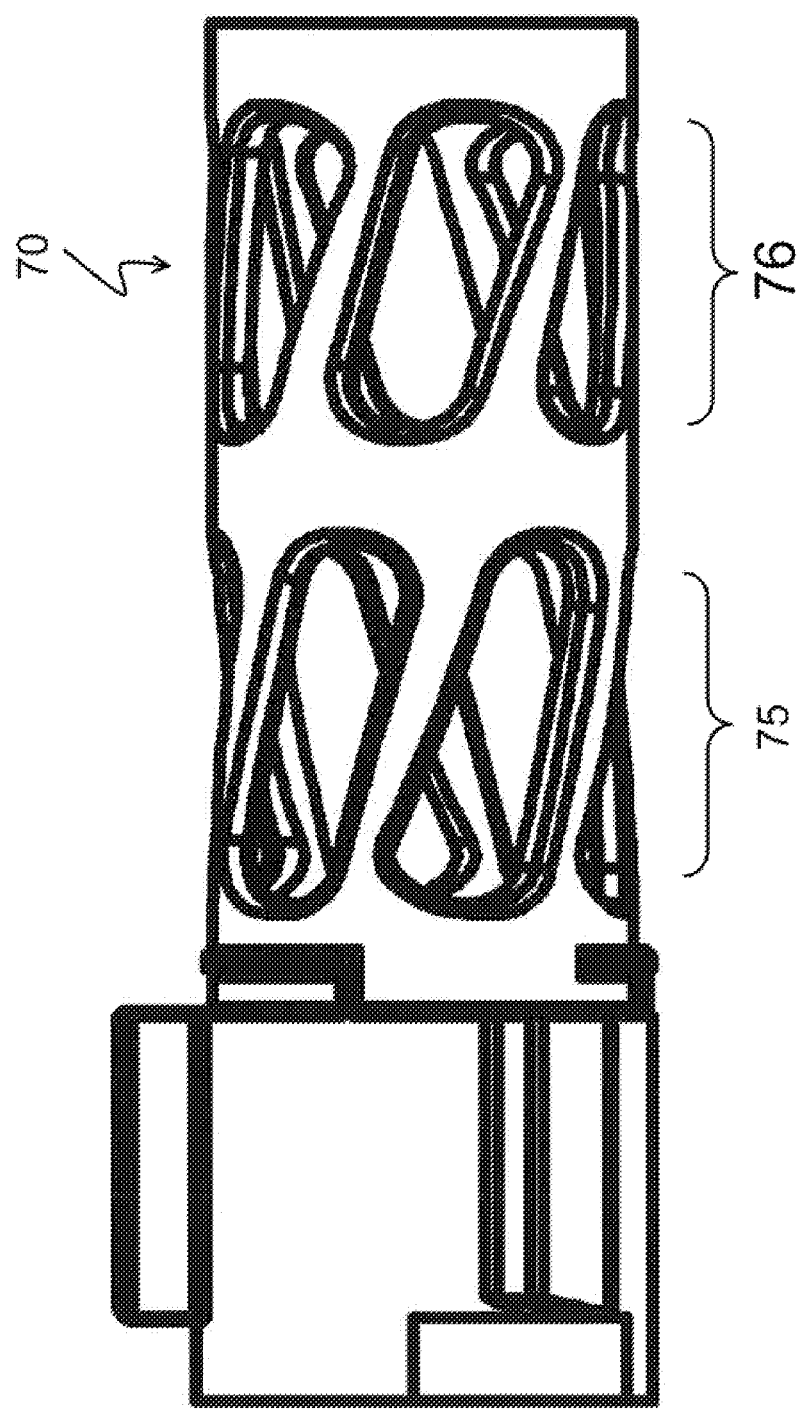
FIG. 10C is a close up side view of the muzzle break shown in FIG. 10A.
Figure 10D:
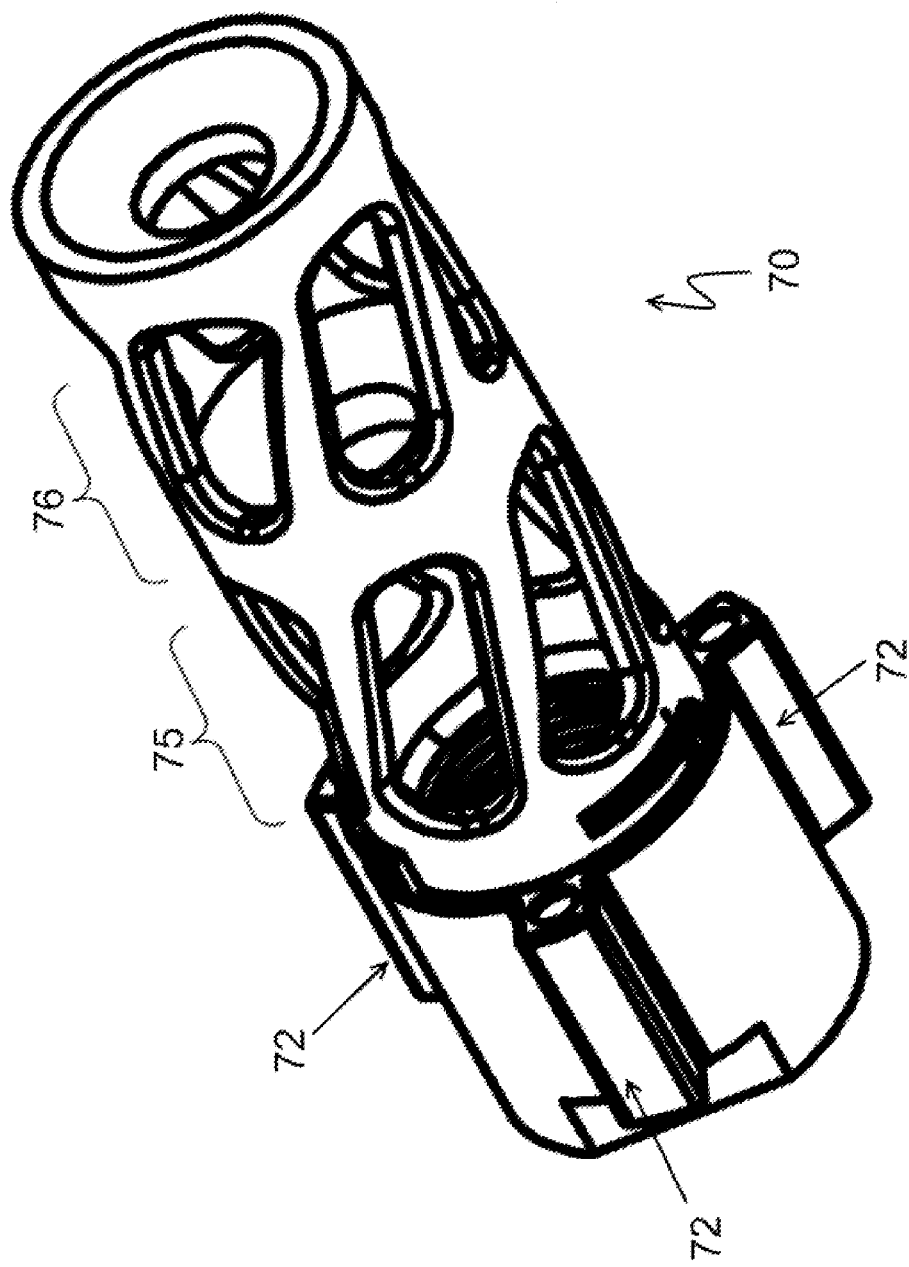
FIG. 10D is a perspective view of the muzzle break shown in FIGS. 10A-C.
Figure 10E:
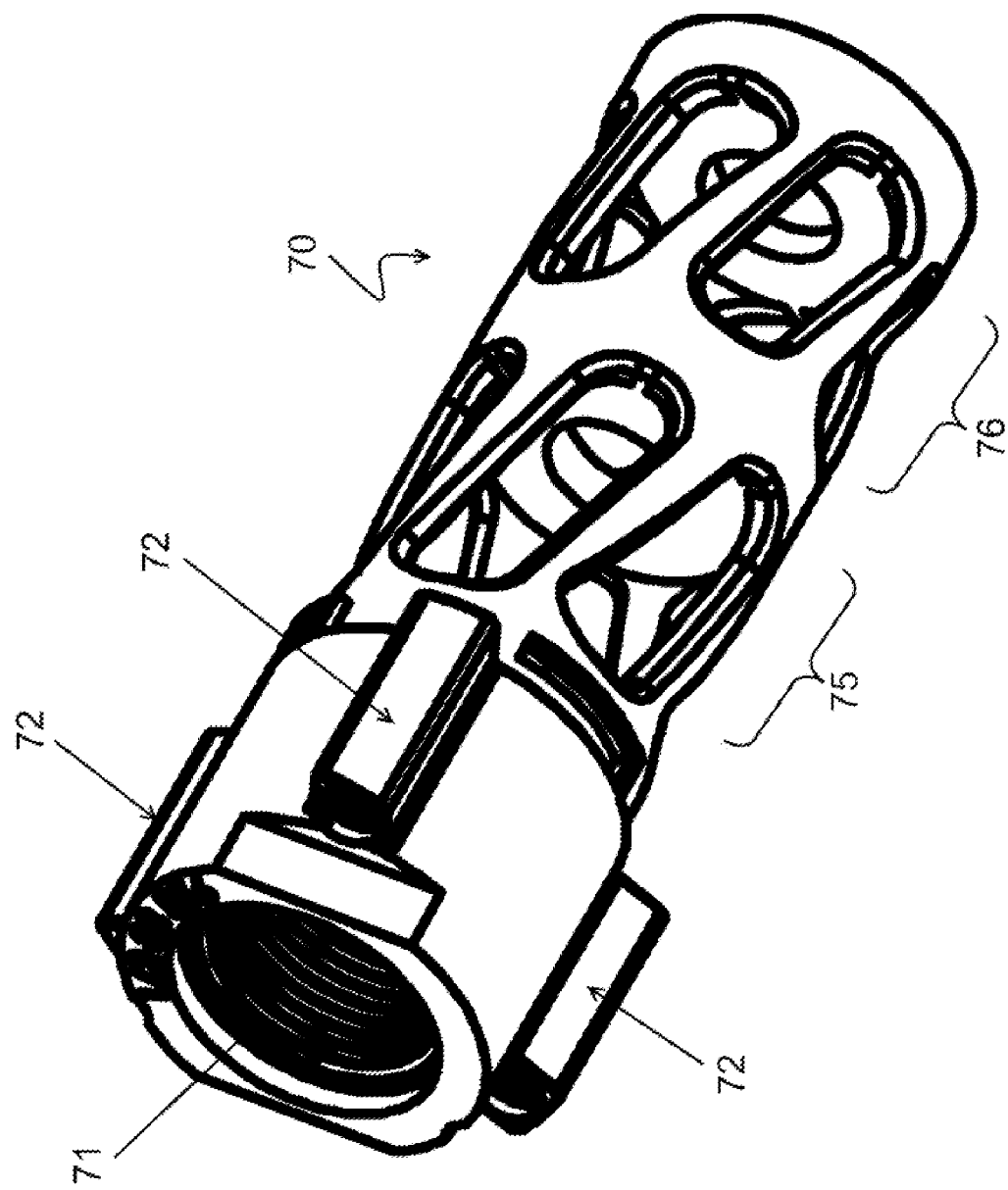
FIG. 10E is a second perspective view of the muzzle break shown in FIGS. 10A-C.

First end wall (41) has an aperture (46) into an overlap channel that is shown as (47) in FIG. 10C.

The first end wall (41), second end wall (42), and side walls (43-45) define a cavity (101).

Figure 9A:
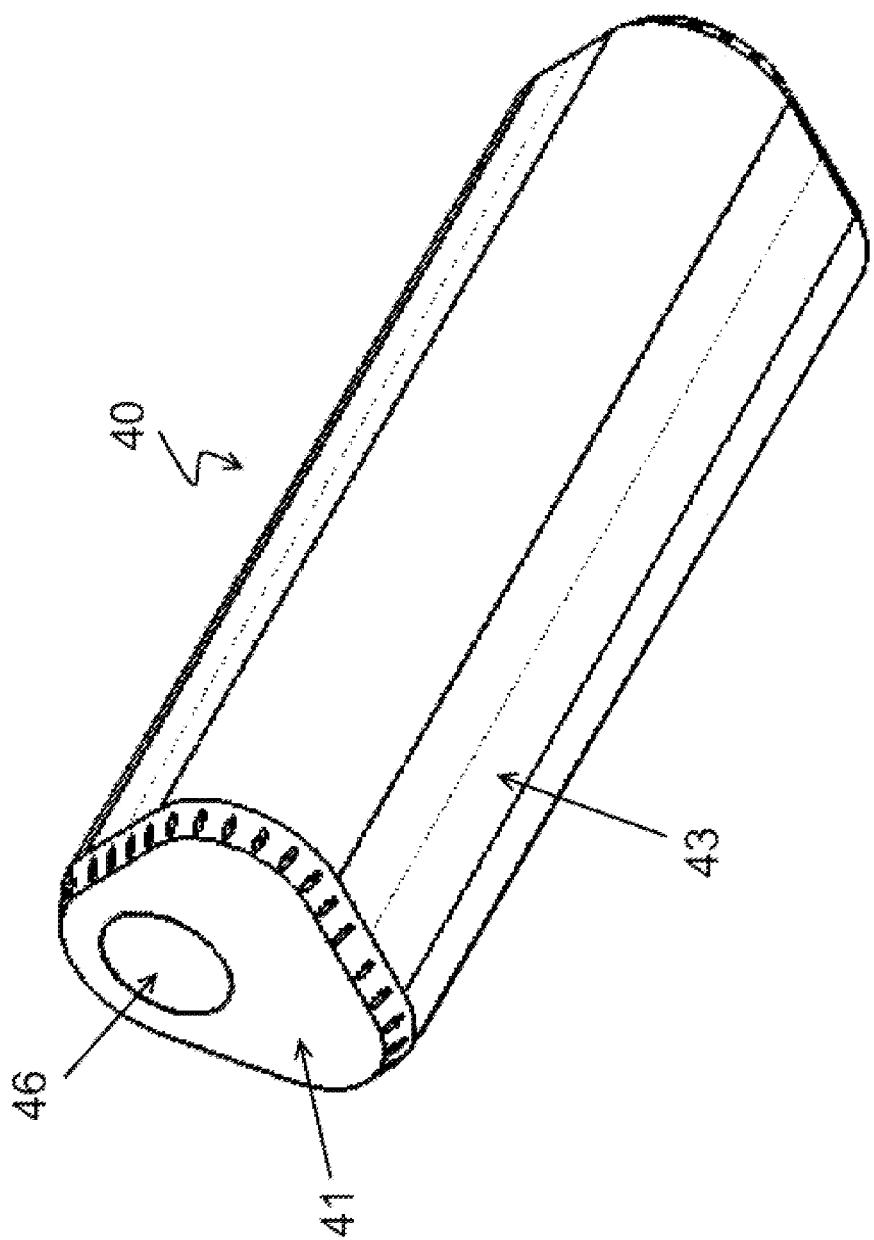
FIG. 9A is a bottom perspective view of a non-symmetrical suppressor according to another aspect of the present invention.
Figure 9C:
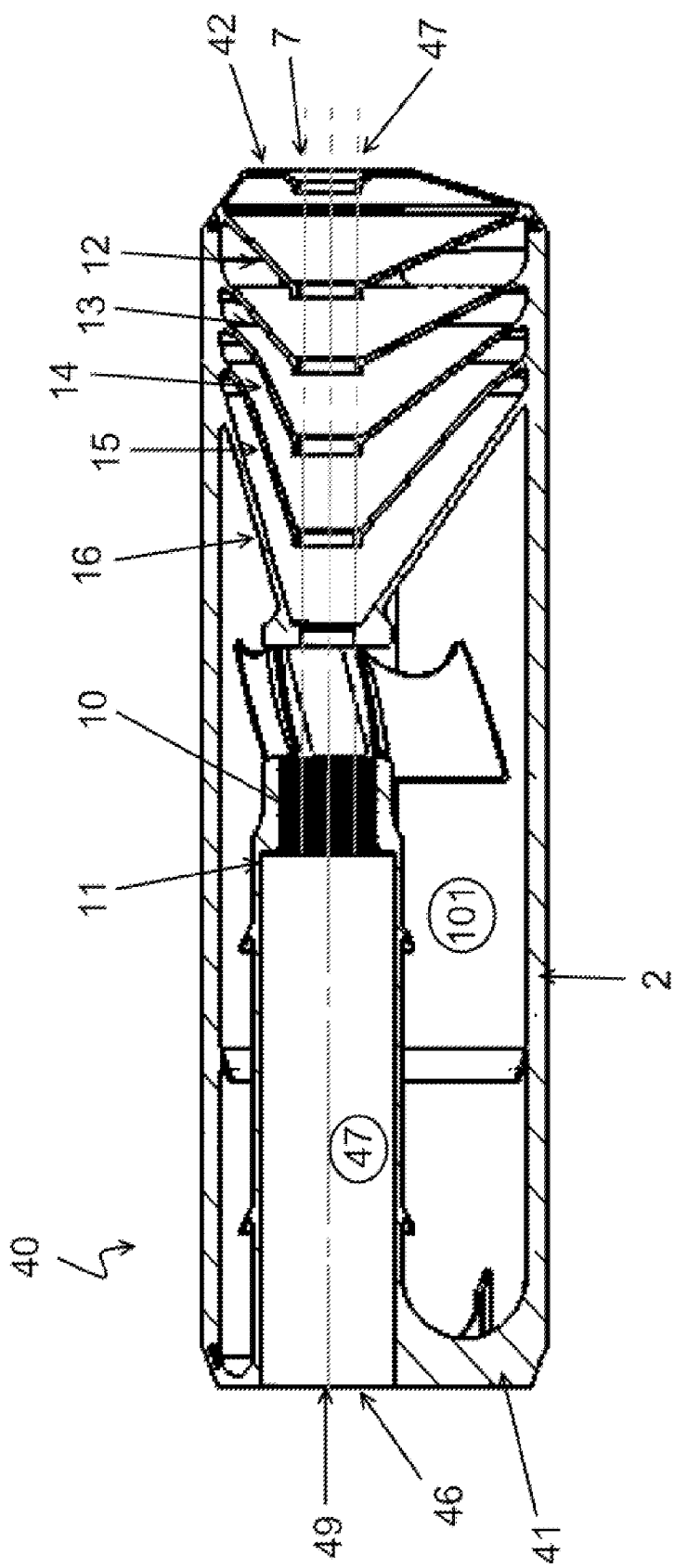
FIG. 9C is a side cross sectional view of the suppressor of FIGS. 9A and 9B.
Figure 9D:
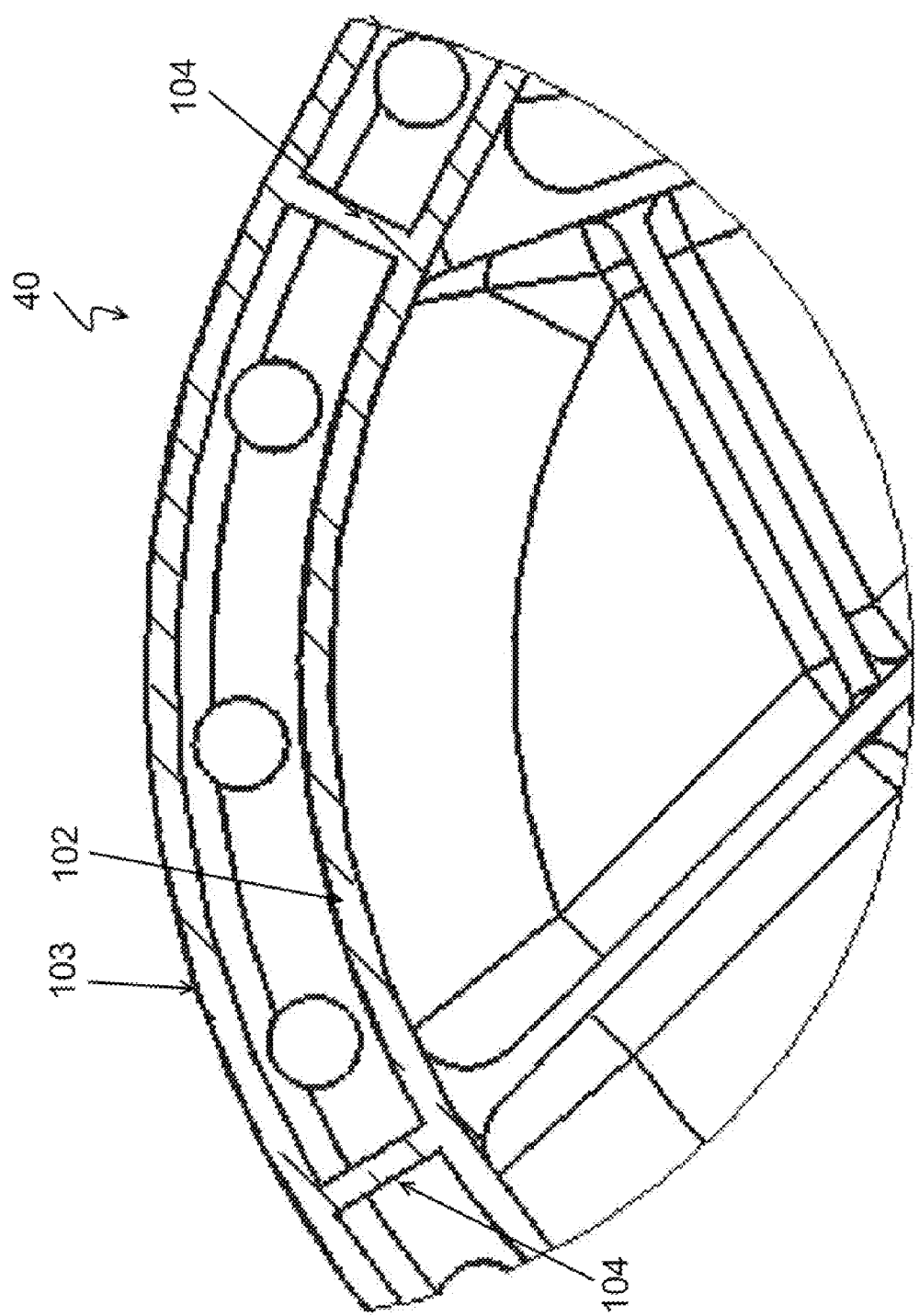
FIG. 9D is a close up end cross sectional view of a suppressor of FIGS. 9A-9C showing the dual wall construction.

A passageway, indicated by line (49) in FIG. 9C extends from aperture (46) through the cavity and to an aperture (47) in second end wall (42).

The suppressor (40) has an inner wall (102) and the second wall (103) that collectively form a double wall structure spacers (104) hold the walls (102, 103) apart from each other. There is a space (104) between the walls (102, 103) which acts to limit or reduce heat transfer from cavity (101) to second wall (103).

Fifth Alternate Embodiment

Referring now to FIG. 14 which is a side cross sectional view of suppressor (50) according to a fourth embodiment of the present invention.

The suppressor (50) has a housing formed by a continuous side wall (51), a first end wall (52) and a second end wall (53) which collectively define a cavity.

Figure 13:
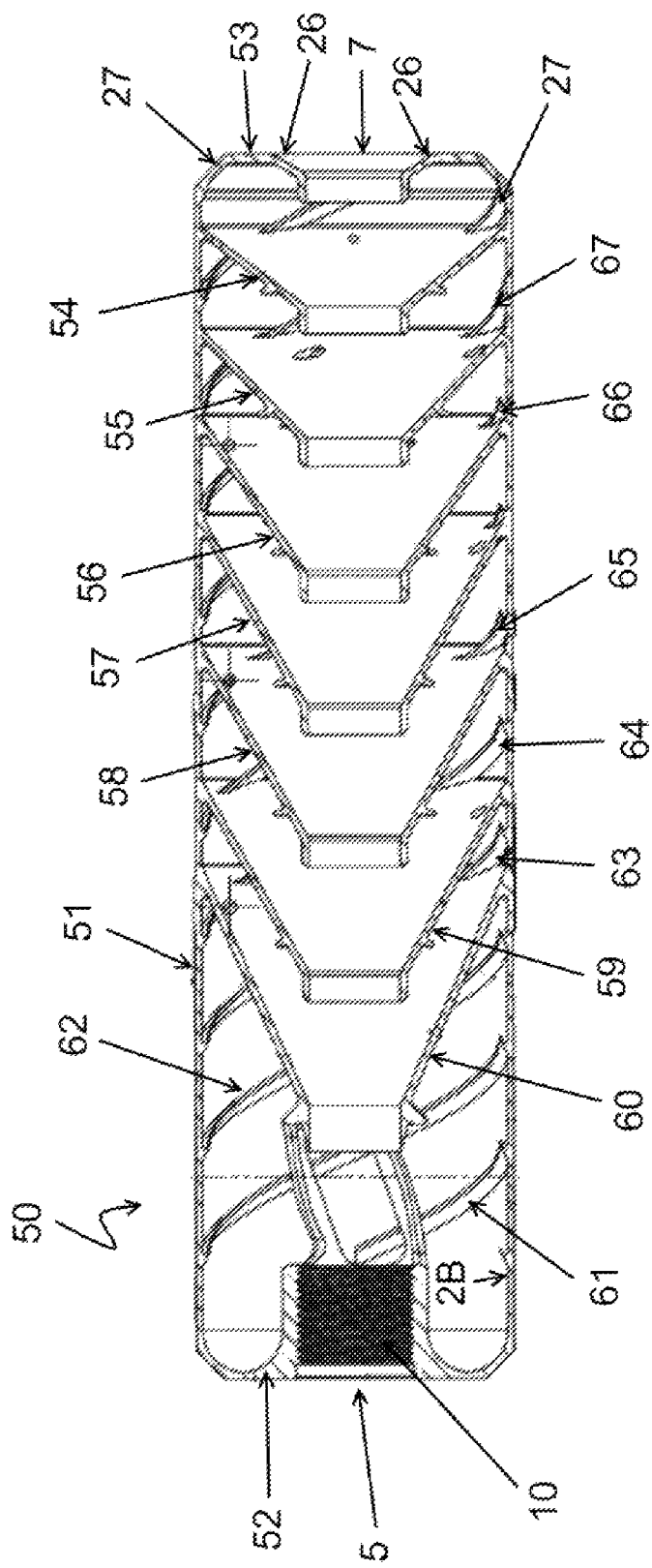
FIG. 13 is a side cross sectional view of a further embodiment of a suppressor according to the present invention
Figure 14A:
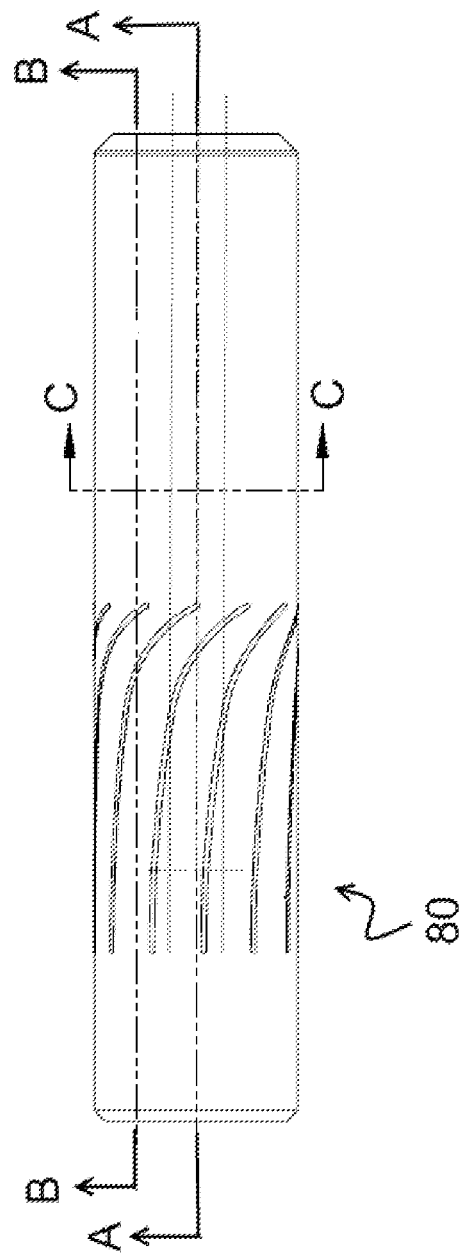
FIG. 14A is a side view of a further embodiment of a suppressor according to the present invention.
Figure 14B:
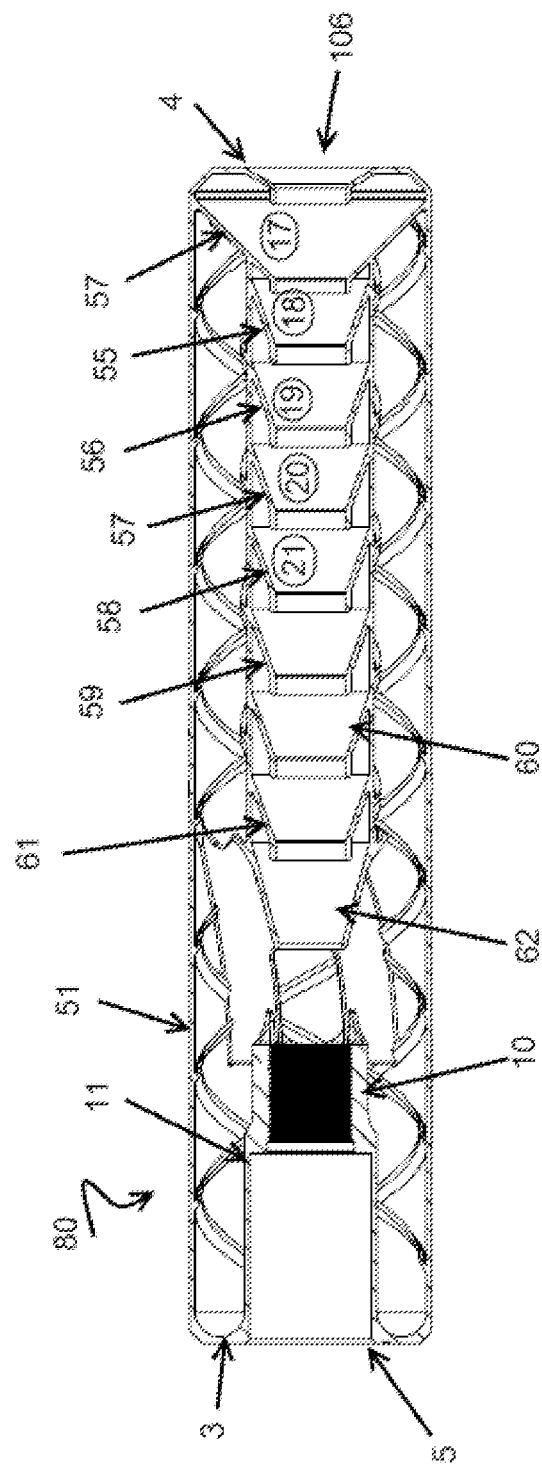
FIG. 14B is a side cross sectional view through line A-A in FIG. 14A.
Figure 14C:
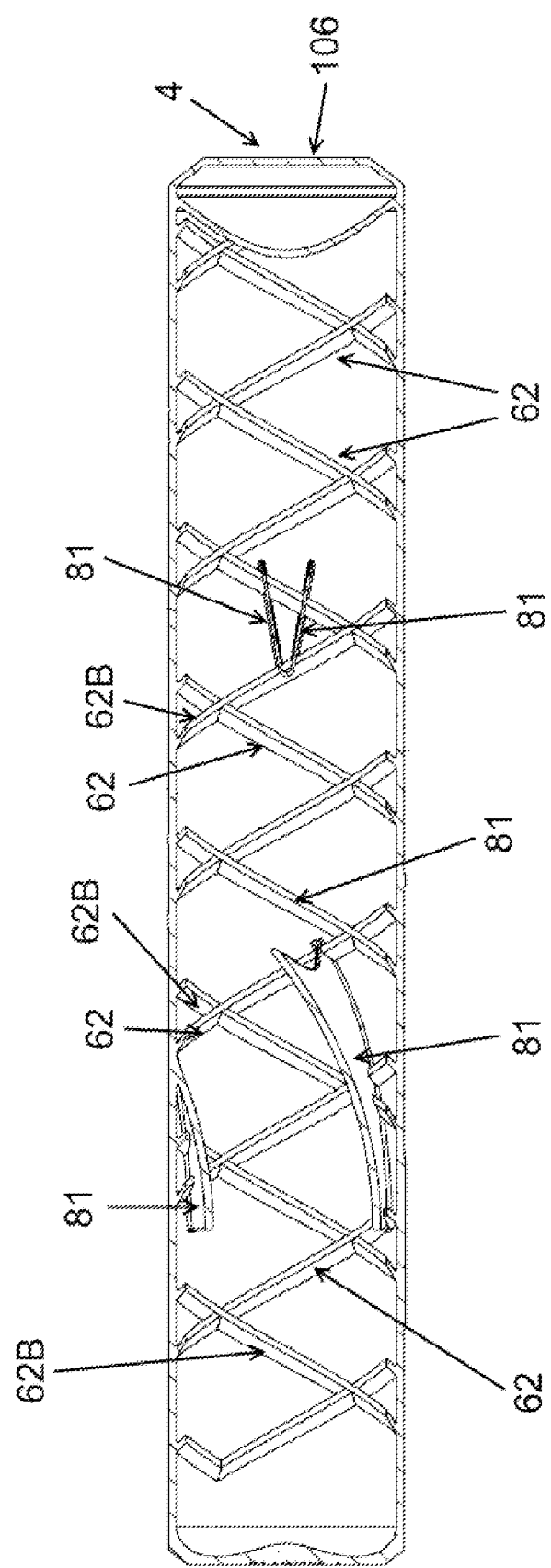
FIG. 14C is a side cross sectional view through line B-B in FIG. 14A.
Figure 14D:
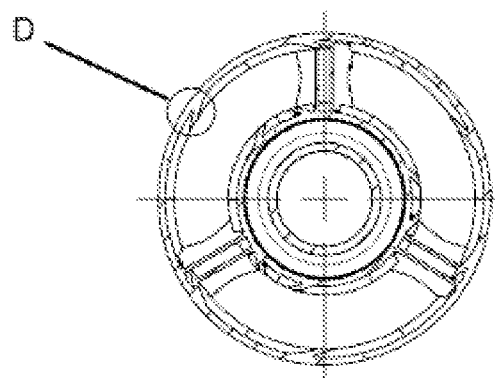
FIG. 14D is a cross sectional view through line C-C in FIG. 14A.
Figure 14E:
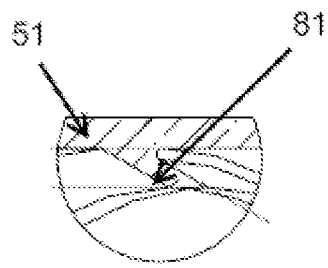
FIG. 14E is a close up view of the detail D in FIG. 14D.
Figure 14F:
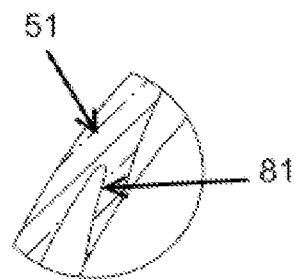
FIG. 14F is a close up view of detail E in FIG. 14C.

A series of baffles (54-60) are constructed so as to be integral to an inner surface of the side wall (2b). This is as discussed above in relation to FIGS. 13A, 13B, and 13C.

The suppressor (50) includes a series of fins (61-67) within the cavity. The fins (61-67) are all identical to each other and spaced apart along the length of the suppressor (50). Therefore only fin (61) will be described herein.

The bottom edge (68) of fin (61) has no support underneath. Therefore the fin (61) must be constructed out from inner surface (2b) of side wall (2) and downwards. As a result, fin (61) is constructed in a reverse direction e.g. downwards with respect to the build direction.

The fin (61) is generally a spiral that extends along the length of the suppressor (50), that wraps around an inner surface (2b) of the side wall (2). In addition, the spiral twists so that inner edge, being the edge of the spiral closest to the centre line of the suppressor (50) is lower than the corresponding point on outer edge formed integrally to the inner surface of side wall.

The shape and orientation of the fin (61) is such that the angles on side between edges of the fin and the inner wall are not equal, one being less than 90 degrees, and the other being greater than 90 degrees.

The fins (61-67) are orientated so that expansion of gas in the cavity is not initially hindered or obstructed. However, the passage of the gas in the cavity as it returns, to try and exit through aperture (7) is disrupted. Therefore, the fins (61-67) may collectively slow down expansion of gas within the cavity thereby improving the operation of the suppressor (50).

The fins (61-67) also provide reinforcement to the suppressor. This could facilitate thinner side or end walls while still achieving a comparable strength suppressor (50).

The ridges may also increase the rigidity of the suppressor (50) or otherwise reduce/eliminate vibrations in the suppressor during its operation. That could be useful for reducing or eliminating audible noises created during use of a suppressor.

Sixth Alternate Embodiment

Referring now to FIGS. 14A-14F showing another embodiment of a suppressor (80) according to the present invention.

Numerals used to describe features of the suppressor (50) are also used to identify similar features of suppressor (80). Therefore, those features will not be described again in relation to FIGS. 14A-14F.

However, suppressor (80) also includes a second fin (62B). The second fin (62B) is orientated counter to the fin (62). Together, the fins (62, 62B) form a double helix extending along the length of the suppressor (80).

The suppressor (80) also includes a plurality of fins (81). The fins are orientated to minimise or reduce their affect on expansion of gases into the chambers in suppressor (80). However, the fins are orientated and configured to hinder, and thereby slow down, the passage of gasses out of the chambers. This is achieved by having the fins orientated so as to allow a clear and uninterrupted passage past the fins (81) as the gas initially expands into a chamber, yet the fins (81) provide a surface against which the expanding gas abuts to thereby create turbulence and slow down the gases expansion.

Therefore the fins (81) may improve the ability of suppressor (80) to reduce the noise caused by firing a gun with which the suppressor (81) is used.

In the embodiment shown in FIGS. 14A-14F the fins (81) and are at an angle of 60° from the build direction (indicated by arrow 106), and have 60 mm pitch per revolution, a width of 1.55 mm and a thickness of 0.5 mm.

Muzzle Brake

Referring now to FIGS. 10A-10E showing views of a muzzle brake (70) according to the present invention.

The muzzle brake (70) is formed using LMS techniques according to the present inventions and using the method described with reference of FIGS. 7 and 8. All components of the muzzle (70) brake are formed integrally to each one other component.

The muzzle brake (70) includes a screw thread (71). A fastener half forming part of a quick connect is provided by a plurality of detents (72) that extend outwardly from a surface (77) of the muzzle brake (70).

The detents (72) are configured to sit within corresponding slots (73) in a suppressor (74) according to the present invention. Interaction between the detents (72) and the slots (73) secures the muzzle brake (70) and therefore a gun (not shown) to the suppressor (74).

The muzzle brake (70) includes a first stage indicated by (75) and a second stage indicated by (76).

The first and second stages assist in controlling expansion of the gas forming a blast wave on firing of the gun (not shown). The first and second stages each comprise a plurality of slot apertures, which extend along the length of the muzzle brake (70). Each of the apertures is orientated so as to define a "twist".

The orientation of the twist is chosen to be orientated opposite the rotation of the gasses and spin created by firing a gun with which the suppressor (74) will be used. This helps to tighten the device onto the gun.

To the inventor's knowledge it was not previously possible to manufacture a suppressor having a quick connect inside an overlap channel. This is because prior art manufacturing techniques were not capable of forming a fastener half of a quick connect at the necessary location. As a result, there is a unique advantage provided by use of LMS techniques to manufacture a suppressor according to the present invention.

However, it was not a straight forward process to design and build a muzzle brake in a suppressor using LMS techniques. The inventor solved the problems which prevented manufacture of these products using the inventions described herein. Therefore, the present inventions enabled LMS manufacturing techniques to be utilised in a new and previously unknown application. Accordingly, the inventions facilitate providing an easier way to connect a gun and suppressor together, while allowing a deep over-barrel design yet still controlling the expansion of gases.

It should also be appreciated that designing of the muzzle brake and quick connect to be manufactured by LMS techniques was not straight forward, and a number of issues had to be resolved.

Quick Connect

As noted above, the muzzle brake (70) includes detents (72) forming part of a quick connect.

In embodiments where the suppressor (74) is to include a quick connect then a fastener half of the quick connect is formed into the suppressor (74).

In the embodiments shown in the Figures, the fastener half is formed by slots (73) in a lip (76) that is formed integrally. However, other positions for the slots (73) are possible provided that these will align with the detents (72).

Each of the slots (73) includes a spring biased ball bearing (not shown in the Figures).

Figure 11A:
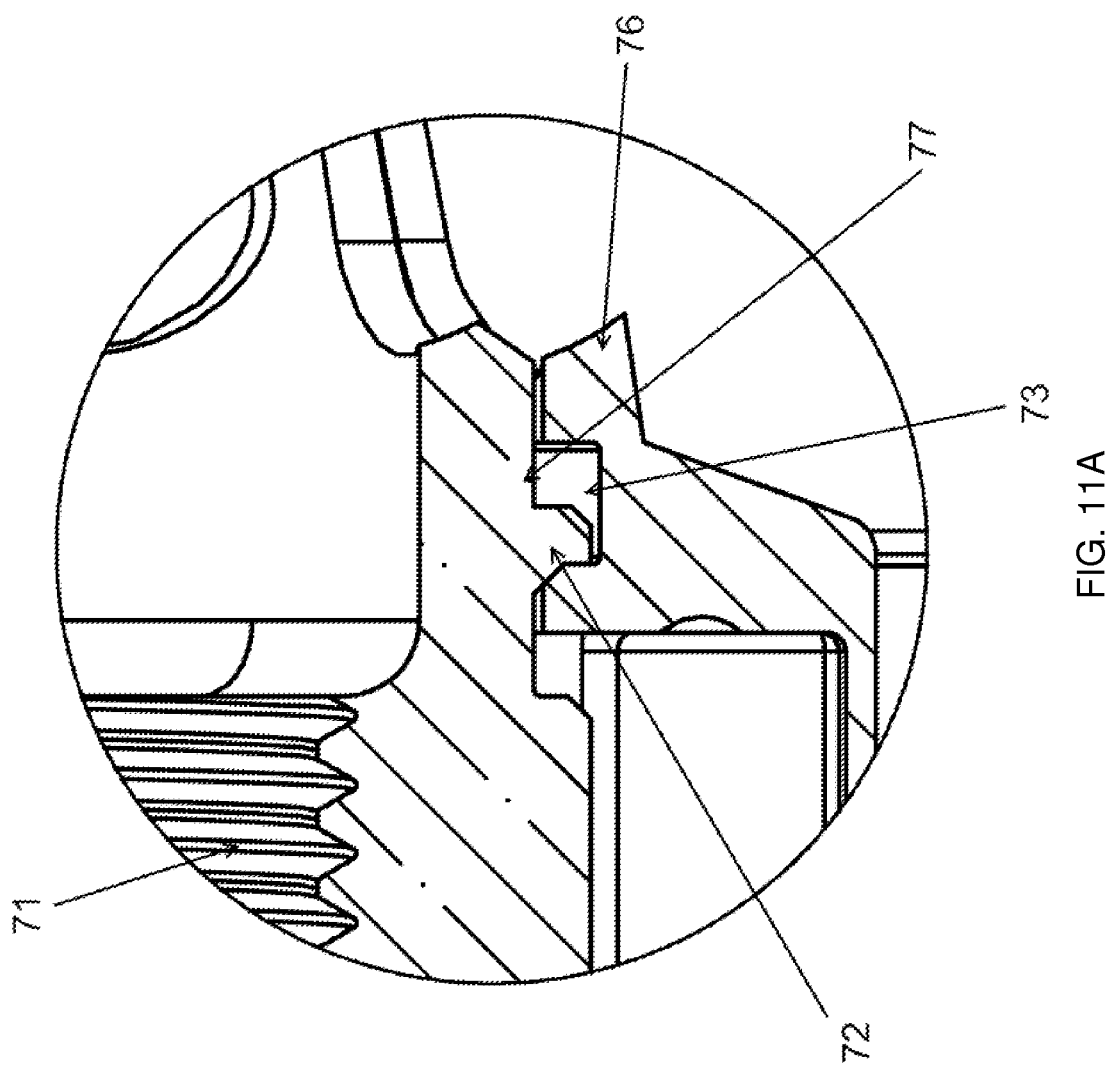
FIG. 11A is a view showing position of fastener halves of a quick connect prior to engagement.
Figure 11B:
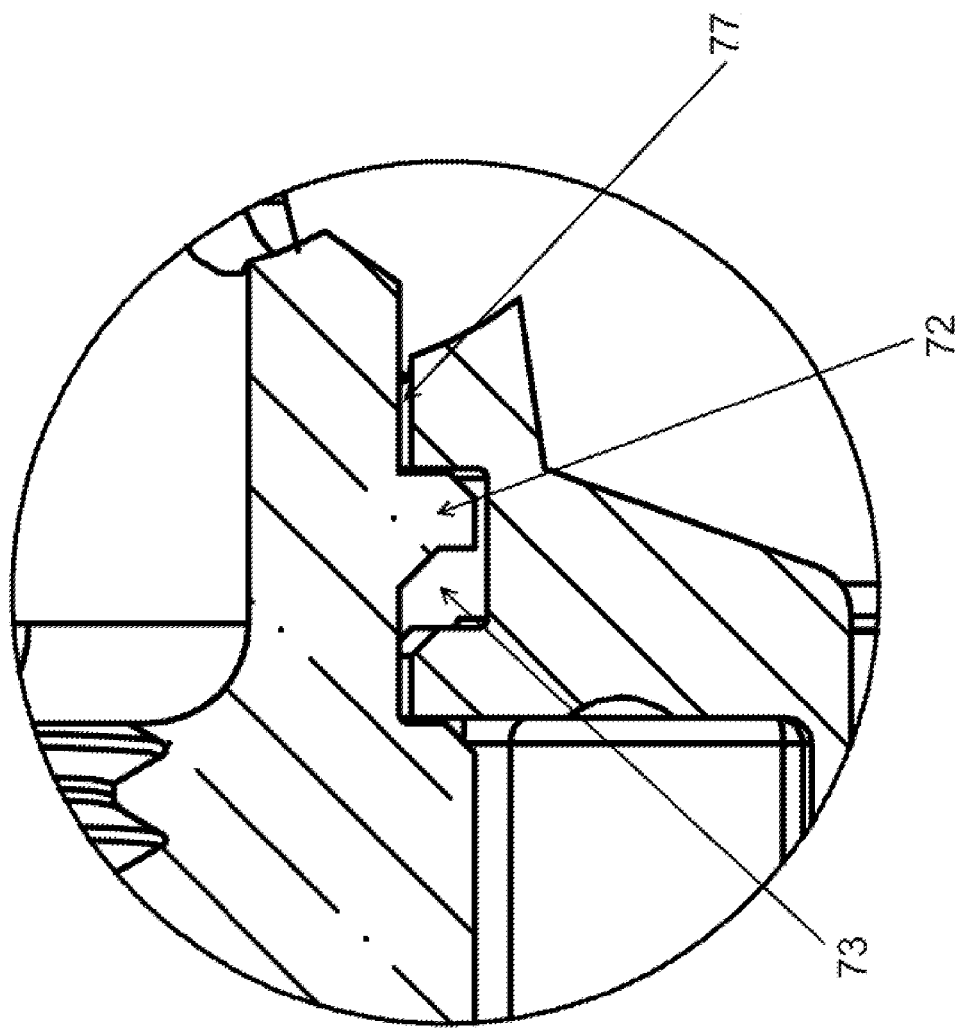
FIG. 11B is a view of FIG. 11A showing position of fastener halves of a quick connect in an engaged position.

The spring biased ball bearing is positioned within the slot (73) such that when the detents (72) are positioned within the slots (73), the suppressor (74) and muzzle brake (70) can be moved rotatably with respect to each other. This causes the detents (not shown) to slide within slots (73) and into a locking position. The locking position is shown in FIG. 11A. In the locking position, each spring biased ball bearing (not shown) bears against an edge of a detent (not shown). This provides resistance force to detents (72) moving within slots (73). Therefore, the spring loaded ball bearing secures the muzzle brake (70) and suppressor (74) with respect to each other.

However, the spring is not so strong that it cannot be overcome by force applied by a user that causes the muzzle brake (70) and/or suppressor (74) to rotate with respect to each other.

The non-locking position is shown in FIG. 11A. In this, the spring loaded ball bearing (not shown) does not bear against detents (72). Therefore the detents (72) can be moved from the slot (73) so as to separate the muzzle brake (70) in the suppressor (74).

Method of Manufacture

Different products according to the present invention are manufactured using the same method. Accordingly, one method of manufacturing a product is described herein.

Figure 7:
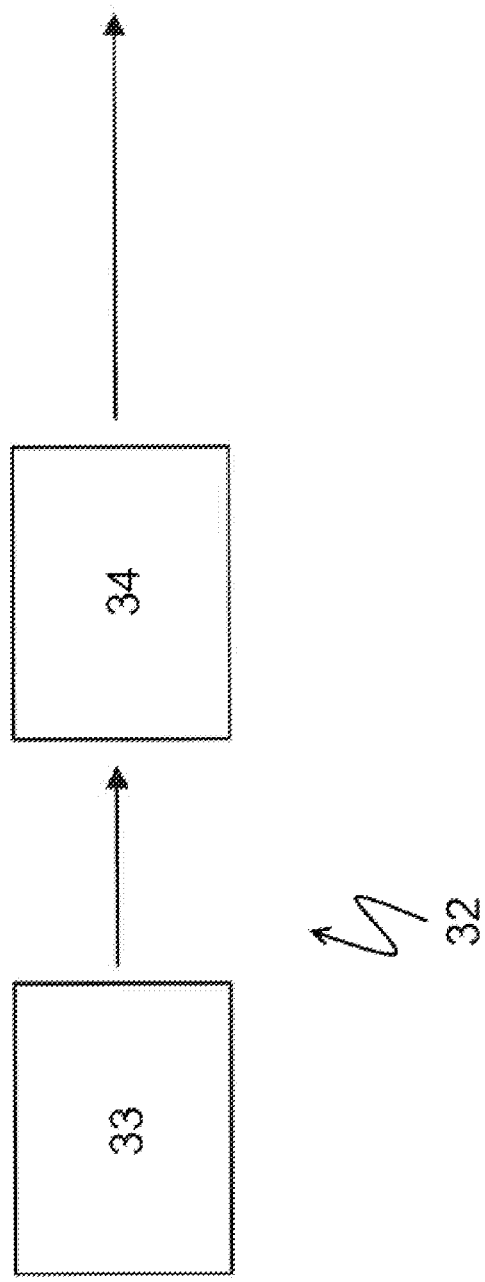
FIG. 7 is a view of an LMS system for use with the present invention.

The method is performed using an additive layering manufacturing system, the representative components of which is indicated as (32) are shown in FIG. 7.

The system (32) includes a computer programming apparatus (33) as should be known to one skilled in the art. The computer programming apparatus is programmed to perform any of all of the steps of the method described herein. In addition, the apparatus is programmed to, or may be configured to, performs steps in the method so as to manufacture the embodiments of the suppressors described herein.

The computer programming apparatus (33) is configured to communicate with a laser metal sintering ("LMS") apparatus (34).

Operation of the LMS apparatus (32) is as should be known to one skilled in the art, and therefore the specifics of the method are not reiterated here. However, parameters such as selection of the starter material, temperature required to achieve necessary fusing of layers of particles of starter material etc. are as known to one skilled in the art.

Figure 8:
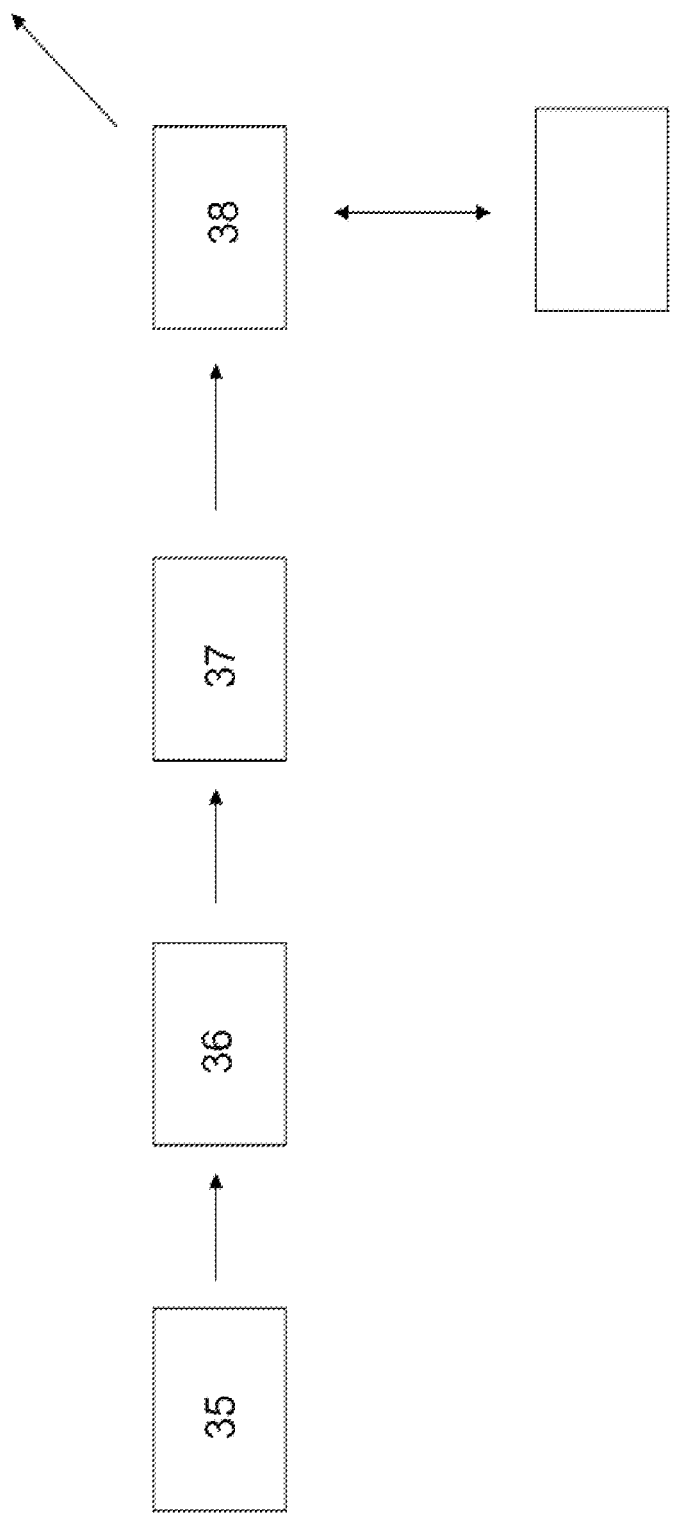
FIG. 8 is a flow chart showing the steps that can be used in a method of manufacturing a suppressor.

Referring now to FIG. 8 showing a schematic of the steps involved in manufacturing a product according to the present invention.

At step (35) an electronic model of a suppressor is created using a modelling package such as CAD Solid Works on computer programming apparatus (33).

Developing the CAD model involves the step of determining a build direction for the product. The build direction is an orientation for a product to be manufactured such as a suppressor with respect to a substrate in the LMS Apparatus (34). The build direction defines the order in which layers of the powdered material are deposited and sintered so as to form the product.

In a preferred embodiment, the build direction requires building a suppressor such as (1) from the second end wall (4).

Developing the model of a product to be manufactured involves the step of determining the angle between various components. For instance, in manufacturing a suppressor (1), a person would determine the angle between an underside of a baffle and a substantially horizontal plane (28).

In addition, internal structures inside a cavity in the product are determined. These will depend on the shape and configuration of the product to be produced. The features of the components are selected according to the relationships described herein so as to ensure that the product can be manufactured using the LMS apparatus.

At step (36) the CAD model is separated into a number of layers of a nominal thickness between 0.01 mm-0.03 mm.

The model and information on the layers is transmitted from the computer programming apparatus (33) in which the model is created to the LMS apparatus (34).

At step (37) a build substrate (not shown) in the Figures is provided in the LMS apparatus (34).

The substrate provides a surface on which the product can be manufactured.

At step (38) the LMS apparatus (34) applies a layer of a titanium oxide alloy in a powder form onto the substrate. A laser (not shown) forming part of the LMS apparatus (34) selectively applies a laser beam to portions of the layer of titanium oxide powder deposited on the substrate (not shown). This causes the laser to selectively heat the titanium oxide powder so as to fuse adjacent particles together. The laser heats a portion of the layered titanium oxide powder corresponding to a first layer of the model of the product generated at step (35). This forms a first sintered layer.

At step (39) a wiper (not shown in the Figures) forming part of the LMS apparatus (34) is used to apply another layer of titanium oxide powder on top of the first sintered layer.

This corresponds to the second layer of the CAD model generated at step (36).

Steps (38 and 39) are repeated so as to substantially form the product.

The formed product can be removed from the LMS apparatus (34) and separated from the substrate (not shown).

Unsuccessful Suppressor Design

Figure 12:
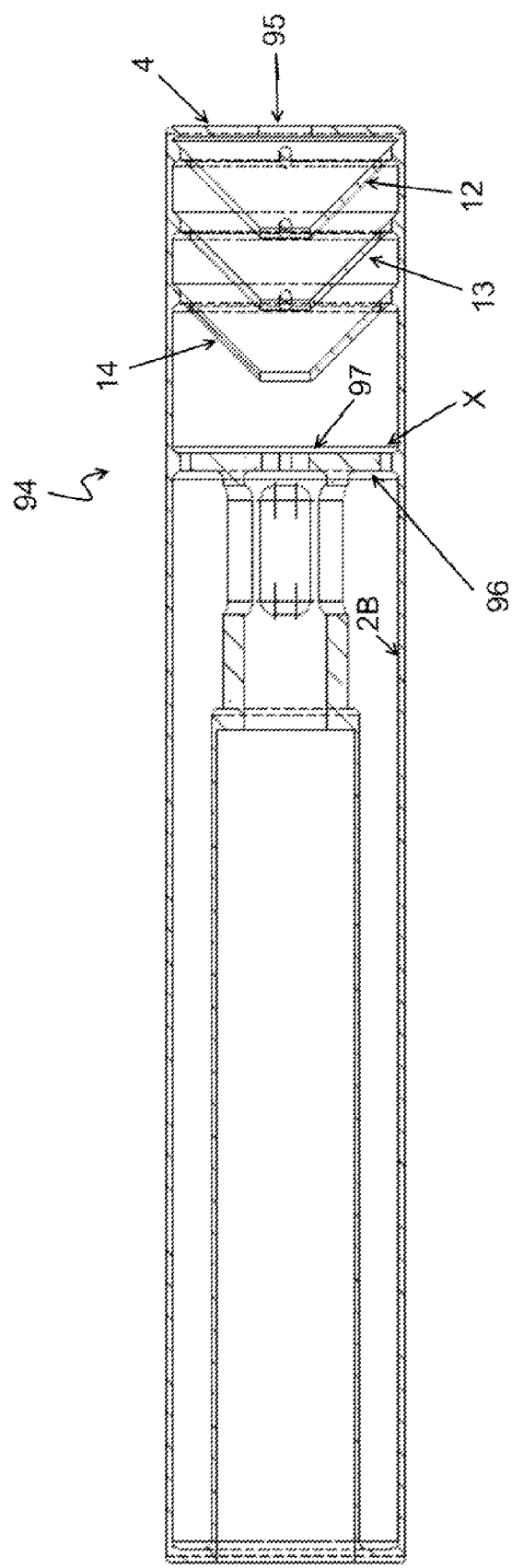
FIG. 12 is a side cross sectional view of a suppressor design that would not successfully build using LMS techniques.

Referring now to FIG. 12 showing a suppressor (94) that would not manufacture using LMS techniques.

The suppressor (94) is designed so that build direction indicated by arrow (95) in FIG. 12 starts from second end wall (4).

The baffles (12-14) would build successfully.

However, the suppressor (94) includes a shelf (96).

The angle (X) between an underside (97), of shelf (96) and an inner wall (2B) of the suppressor is substantially 90 degrees.

As a result, there is insufficient support for layers of the powdered feed material deposited through a manufacturing of the suppressor (94). As a result, the shelf (96) would not successfully build using an LMS technique.

In addition, the shelf (96) and baffle (14) integrally joined to the shelf (96), have different thicknesses. This is necessary to try to ensure that sufficient material is deposited to enable building of a subsequent baffle up from the shelf (96). However, the different thicknesses lead to thermal gradient throughout the components of the suppressor (94). Those thermal gradients are a result of parameters of the LMS apparatus (34) being fixed (invariable) during the manufacturer of a particular part. As a result, it is not possible to vary the amount of energy which laser of the LMS apparatus (34) imparts to different parts of the suppressor (94) during its manufacture. As a result, the parameters of the laser are often selected so as to provide an average suitable for use in preforming all parts of the suppressor any given part. However though, the average chosen will not work with all particular components, meaning that selection of design features is particularly important to successfully building of suppressors.

Aspects of the present invention have been described by way of example only and it should be appreciated that modifications and additions may be made thereto without departing from the scope thereof as defined in the appended claims.

What I claim is:

1. A method of manufacturing a suppressor for a firearm using selective laser melting, wherein the suppressor includes a first end wall, a second end wall, and at least one cylindrical sidewall connecting the first and second end walls, and at least one baffle,
wherein the method includes the steps of:
   a. depositing a starter material onto a substrate;
   b. melting the starter material to form part of the suppressor;
   c. repeating steps (a) and (b) so as to substantially form the suppressor and the at least one baffle within the cavity monolithically attached to an inner surface of the at least one sidewall by an integral joint.

2. The method as claimed in claim 1, wherein the method forms the at least one baffle monolithically attached substantially about the inner circumference of the inner wall.

3. The method as claimed in claim 1, wherein steps a-c form apertures in the first end wall, second end wall and the at least one baffle such that the apertures are aligned with each other and define a pathway for a bullet to travel through the suppressor.

4. The method as claimed in claim 1, including the step of forming a fastener integrally to the suppressor.

5. The method as claimed in claim 1, wherein the step of forming the baffle involves creating an integral join between the baffle and an internal surface of the at least one side wall such that an internal angle between the inner wall and the at least one baffle in the range of 10 to 85 degrees.

6. The method as claimed in claim 1, wherein steps a-c form an inner wall and an outer wall so as to create a double wall structure.

7. The method as claimed in claim 1, including the step of forming a fastener half of a quick connect in the suppressor.

8. The method as claimed in claim 1, including the step of forming ridges on an outer surface of the at least one side wall.

9. The method as claimed in claim 7, wherein the fastener half is positioned in an overlap channel formed in the suppressor.

10. The method as claimed in claim 1, including the step of selecting a feed material from the list of: titanium or a titanium alloys, pure titanium (TI), TI6A14V, NITI(45-55NI), TI6A17MB, TI5A12.5FE, TI3NB13ZR, TI12MO6ZR2FE, NITICU alloys, TI15MO, TI35NB7ZR, 5TA, TI3A1 2.5V, or Inconel 718.

11. A suppressor for a firearm manufactured using a selective metal melting technique, wherein the suppressor includes
   a first end wall,
   a second end wall,
   at least one cylindrical sidewall between the first and second end walls, wherein the first and second end walls and the at least one side wall collectively define a cavity,
   at least one baffle within the cavity, and wherein the at least one baffle is monolithically attached to an inner surface of the at least one sidewall by an integral joint.

12. The suppressor as claimed in claim 11, wherein the at least one baffle is monolithically attached substantially about the inner circumference.

13. The suppressor as claimed in claim 11, wherein the suppressor is formed from titanium or a titanium alloys, pure titanium (TI), TI6A14V, NITI(45-55NI), TI6A17MB, TI5A12.5FE, TI3NB13ZR, TI12MO6ZR2FE, NITICU alloys, TI15MO, TI35NB7ZR, 5TA, TI3A1 2.5V, or Inconel 718.

14. The suppressor as claimed in claim 11, wherein the first end wall, second end wall, at least one baffle, each include an aperture, and wherein the apertures are aligned so as to form a pathway for a bullet to travel through the suppressor.

15. The suppressor as claimed in claim 11, including a fastener formed integrally to at least one component of the suppressor.

16. The suppressor as claimed in claim 15, wherein the fastener comprises a screw thread.

17. The suppressor as claimed in claim 11, including a fastener half forming part of a quick connect.

18. The suppressor as claimed in claim 11, wherein an internal angle between an inner wall of the suppressor and the baffle is in the range of 10 to 85 degrees, and more preferably 15 degrees.

19. The suppressor as claimed in claim 11, including an inner wall and an outer wall that together form a double wall structure.

20. A system configured to manufacture a suppressor for a firearm, and wherein the suppressor includes a first end wall, a second end wall, and at least one cylindrical side wall connecting the first and second end walls, and at least one baffle,
   the system comprising a computer programming apparatus and laser metal sintering apparatus,
   and wherein the system is configured to perform the steps of:
   a. depositing a starter material onto a substrate;
   b. melting the starter material to form part of the suppressor;
   c. repeating steps (a) and (b) so as to substantially form the suppressor and at least one baffle within the cavity which is monolithically attached to an inner surface substantially about the inner circumference of the at least one sidewall by an integral joint.

21. The system as claimed in claim 20, configured to form an aperture in the first end wall, the second end wall, and the at least one baffle such that the apertures are aligned with each other and define a passage through the suppressor.

22. The system as claimed in claim 20, configured to perform the step of forming a fastener integrally to the suppressor.

23. The system as claimed in claim 20, configured such that the step of forming the baffle involves creating an integral join between the baffle and an internal surface of the at least one side wall such that an internal surface of the at least side wall creates an internal angle between the inner wall and the baffle in the range of 10 to 85 degrees.

24. The system as claimed in claim 20, configured such that performing steps a-c form an inner wall and an outer wall so as to create a double wall structure.

25. The system as claimed in claim 20, configured to perform the step of forming a fastener half of a quick connect in the suppressor.

26. The system as claimed in claim 20, configured to perform steps a-c so as to form a muzzle brake.

\* \* \* \* \*